United States Patent
Juneja et al.

(10) Patent No.: US 10,423,727 B1
(45) Date of Patent: Sep. 24, 2019

(54) SYSTEMS AND METHODS FOR PROCESSING NUANCES IN NATURAL LANGUAGE

(71) Applicant: Wells Fargo Bank, N.A., San Francisco, CA (US)

(72) Inventors: Romica Juneja, Plano, TX (US); Abhijit Rao, Irvine, CA (US)

(73) Assignee: Wells Fargo Bank, N.A., San Francisco, CA (US)

(*) Notice: Subject to any disclaimer, the term of this patent is extended or adjusted under 35 U.S.C. 154(b) by 0 days.

(21) Appl. No.: 15/868,448

(22) Filed: Jan. 11, 2018

(51) Int. Cl.
*G06F 17/28* (2006.01)
*G06F 17/27* (2006.01)
*G10L 15/18* (2013.01)
*G10L 15/22* (2006.01)
*G10L 13/04* (2013.01)

(52) U.S. Cl.
CPC ........ *G06F 17/2836* (2013.01); *G06F 17/275* (2013.01); *G06F 17/289* (2013.01); *G10L 13/043* (2013.01); *G10L 15/18* (2013.01); *G10L 15/22* (2013.01)

(58) Field of Classification Search
CPC ....... G06F 17/289; G06F 17/28; G06F 17/275
See application file for complete search history.

(56) References Cited

U.S. PATENT DOCUMENTS 6,067,520 A     5/2000 Lee
6,275,806 B1    8/2001 Pertrushin
(Continued)

FOREIGN PATENT DOCUMENTS

CA     2957716 A1    2/2016
CA     2962636 A1    4/2016
(Continued)

OTHER PUBLICATIONS

Becker, Karin, et al. "Multilingual Emotion Classification Using Supervised Learning: Comparative Experiments." Information Processing and Management, vol. 53, Issue 3, May 2017, pp. 684-704.
(Continued)

*Primary Examiner* — Samuel G Neway
(74) *Attorney, Agent, or Firm* — Alston & Bird, LLP

(57) ABSTRACT

Systems, apparatuses, methods, and computer program products are disclosed for processing electronic information indicative of natural language. An example method includes receiving first electronic information indicative of a sequence of words provided by a user and identifying, based on the first electronic information, a first word and a first natural language. The example method further includes receiving second electronic information indicative of an exogenous event and identifying, based on the second electronic information, the exogenous event. The example method further includes generating one or more natural language attribute data sets based on the identified first word, first language, and exogenous event. The example method further includes generating a natural language transliteration data set based on the one or more natural language attribute data sets. Subsequently, the example method includes generating, based on the natural language transliteration data set, a translation of the first word in a second natural language.

20 Claims, 19 Drawing Sheets

(56) References Cited

U.S. PATENT DOCUMENTS

| | | | |
|---|---|---|---|
| 6,356,865 | B1 | 3/2002 | Franz et al. |
| 7,643,985 | B2 | 1/2010 | Horvitz |
| 7,778,632 | B2 | 8/2010 | Kurlander et al. |
| 8,370,146 | B1 | 2/2013 | Schalkwyk et al. |
| 8,407,041 | B2 | 3/2013 | Deng et al. |
| 8,566,088 | B2 | 10/2013 | Pinson et al. |
| 8,775,165 | B1* | 7/2014 | Oikawa ............ G06F 17/241 704/10 |
| 9,129,591 | B2 | 9/2015 | Sung et al. |
| 9,177,549 | B2 | 11/2015 | Agiomyrgiannakis |
| 9,223,776 | B2 | 12/2015 | Bernard |
| 9,245,254 | B2 | 1/2016 | Lord et al. |
| 9,253,519 | B2 | 2/2016 | Begeja et al. |
| 9,471,887 | B2 | 10/2016 | Shin et al. |
| 9,477,652 | B2 | 10/2016 | Huang |
| 9,483,159 | B2 | 11/2016 | Myslinski |
| 9,514,130 | B2 | 12/2016 | Waibel |
| 9,552,354 | B1 | 1/2017 | Seligman et al. |
| 9,558,183 | B2 | 1/2017 | Suendermann et al. |
| 9,672,497 | B1 | 6/2017 | Lewis et al. |
| 9,733,894 | B2 | 8/2017 | Brown et al. |
| 2002/0002464 | A1 | 1/2002 | Petrushin |
| 2003/0191626 | A1* | 10/2003 | Al-Onaizan ........ G06F 17/2223 704/8 |
| 2004/0111272 | A1 | 6/2004 | Gao et al. |
| 2004/0243392 | A1 | 12/2004 | Chino et al. |
| 2005/0255431 | A1 | 11/2005 | Baker |
| 2007/0022134 | A1* | 1/2007 | Zhou .................. G06F 17/2795 |
| 2007/0043567 | A1 | 2/2007 | Gao et al. |
| 2007/0100704 | A1 | 5/2007 | Liu et al. |
| 2007/0112906 | A1 | 5/2007 | Liu et al. |
| 2007/0282594 | A1 | 12/2007 | Spina |
| 2008/0198978 | A1 | 8/2008 | Olligschlaeger |
| 2008/0262827 | A1 | 10/2008 | DeGroot |
| 2010/0082324 | A1* | 4/2010 | Itagaki ................ G06F 17/2836 704/2 |
| 2011/0138286 | A1 | 6/2011 | Kaptelinin et al. |
| 2012/0253785 | A1* | 10/2012 | Hamid ................ G06F 17/2229 704/4 |
| 2012/0284015 | A1 | 11/2012 | Drewes |
| 2014/0046891 | A1 | 2/2014 | Banas |
| 2015/0149149 | A1 | 5/2015 | Frei et al. |
| 2015/0310862 | A1 | 10/2015 | Dauphin et al. |
| 2016/0098993 | A1 | 4/2016 | Yamamoto et al. |
| 2016/0117316 | A1 | 4/2016 | Le et al. |
| 2016/0117593 | A1 | 4/2016 | London |
| 2016/0283462 | A1* | 9/2016 | Galle .................... G06Q 50/01 |
| 2016/0350290 | A1 | 12/2016 | Fujiwara et al. |
| 2017/0004824 | A1 | 1/2017 | Yoo et al. |
| 2017/0018272 | A1 | 1/2017 | Lee et al. |
| 2017/0025119 | A1 | 1/2017 | Song et al. |
| 2017/0084295 | A1 | 3/2017 | Tsiartas et al. |
| 2017/0091653 | A1 | 3/2017 | Jat et al. |
| 2017/0139905 | A1 | 5/2017 | Na |
| 2017/0140753 | A1 | 5/2017 | Jaitly et al. |
| 2017/0160813 | A1 | 6/2017 | Divakaran et al. |
| 2017/0193397 | A1 | 7/2017 | Kottha et al. |
| 2017/0206891 | A1 | 7/2017 | Lev-Tov et al. |

FOREIGN PATENT DOCUMENTS

| | | |
|---|---|---|
| EP | 506730 A1 | 10/1992 |
| EP | 880772 A1 | 12/1998 |
| EP | 1410637 A2 | 4/2004 |
| EP | 1532507 A2 | 5/2005 |
| EP | 2702586 A2 | 3/2014 |
| EP | 3133595 A1 | 2/2017 |
| KR | 10-2015-0114973 A | 10/2015 |
| KR | 10-2016-0138837 A | 12/2016 |
| WO | WO-9110196 A1 | 7/1991 |
| WO | WO-9729482 A1 | 8/1997 |
| WO | WO-2004/021148 A2 | 3/2004 |
| WO | WO-2005/098620 A2 | 10/2005 |
| WO | WO-2012/148957 A2 | 11/2012 |
| WO | WO-2015/023365 A1 | 2/2015 |
| WO | WO-2016/054230 A1 | 4/2016 |
| WO | WO-2017/049350 A1 | 3/2017 |
| WO | WO-2017/078792 A1 | 5/2017 |
| WO | WO-2017/112813 A1 | 6/2017 |

OTHER PUBLICATIONS

Gawronska, Barbara. "Employing Cognitive Notions in Multilingual Summarization of News Reports." The 7th International Workshop on Natural Language Understanding and Logic Programming, Jul. 28, 2002, <URL: http://www.cs.haifa.ac.il/~shuly/nlulp02/papers/gawronska.pdf> 17 pages.

Hajmohammadi, Mohammad Sadegh., et al. "Cross-Lingual Sentiment Classification Using Multiple Source Languages In Multi-View Semi-Supervised Learning." Engineering Applications of Artificial Intelligence 36 (2014), 195-203.

Hsu, Jeremy. "Google Translate Gets a Deep-Learning Upgrade." IEEE Spectrum: Technology, Engineering, and Science News. IEEE Spectrum, Oct. 3, 2016. Web. Jun. 16, 2017; retrieved from the Internet; <URL:https://spectrum.ieee.org/tech-talk/computing/software/google-translate-gets-a-deep-learning-upgrade> [retrieved Jan. 31, 2018]; 2 pages.

Sheena, N., et al. "Automatic Extraction of Hypernym & Meronym Relations in English Sentences Using Dependency Parser." Procedia Computer Science, vol. 93, 2016, pp. 539-546.

Shen, Peng, et al. "Combination of Multiple Acoustic Models With Unsupervised Adaptation for Lecture Speech Transcription." Speech Communication vol. 82, pp. 1-13 (Sep. 2016).

Turovsky, Barak. "Found in Translation: More Accurate, Fluent Sentences in Google Translate." Google. Google, Nov. 15, 2016. Web. Jun. 16, 2017.

* cited by examiner

520

| NLA Data Set #2: Topic | Finance | Social | Personal | Political |
|---|---|---|---|---|
| Initial Score Value | 0.20 | 0.33 | 0.15 | 0.40 |
| Weightage Value | 0.40 | 0.30 | 0.20 | 0.10 |
| Final Score Value | 0.80 | 0.10 | 0.30 | 0.40 |

| NLA Data Set #3: Sentiment | Polarity | Perspective | Statement |
|---|---|---|---|
| Sentiment | Subjective | Negativity | Declarative |
| Initial Score Value | 0.21 | 0.20 | 0.39 |
| Weightage Value | 0.40 | 0.40 | 0.20 |
| Final Score Value | 0.85 | 0.82 | 0.79 |

| NLA Data Set #4: Framing Effect | Positive | Negative | Neutral |
|---|---|---|---|
| Initial Score Value | 0.20 | 0.30 | 0.40 |
| Weightage Value | 0.30 | 0.50 | 0.20 |
| Final Score Value | 0.12 | 0.30 | 0.16 |

562 (spans Positive, Negative, Neutral columns)
564 — Final Score Value
566 — 0.12
568 — 0.30

| NLA Data Set #5: Viability | Financial Stability | Environmental Sustainability | Societal Values |
|---|---|---|---|
| Initial Score Value | 0.15 | 0.10 | 0.20 |
| Weightage Value | 0.50 | 0.20 | 0.30 |
| Final Score Value | 0.36 | 0.10 | 0.30 |

| NLT Data Set | NLA Data Set #1 Deviation Data | | NLA Data Set #2 Deviation Data | | NLA Data Set #3 Deviation Data | |
|---|---|---|---|---|---|---|
| Possible Translation | Distance | Range | Distance | Range | Distance | Range |
| "weak" | 0.80 | 0.60-0.90 | 0.30 | 0.30-0.60 | 0.30 | 0.40-0.80 |
| "vulnerable" | 0.60 | 0.40-0.70 | 0.90 | 0.30-0.60 | 0.40 | 0.50-0.70 |
| "sick" | 0.60 | 0.10-0.40 | 0.20 | 0.30-0.60 | 0.30 | 0.70-0.90 |
| "gloomy" | 0.70 | 0.30-0.50 | 0.40 | 0.55-0.80 | 0.40 | 0.75-1.00 |
| "..." | ... | ... | ... | ... | ... | ... |

| NLT Data Set Possible Translation | NLA Data Set #1 Deviation Data | | NLA Data Set #2 Deviation Data | | NLA Data Set #3 Deviation Data | |
|---|---|---|---|---|---|---|
| | Distance | Range | Distance | Range | Distance | Range |
| "weak" | 0.80 | 0.60-0.90 | 0.30 | 0.30-0.60 | 0.30 | 0.40-0.80 |
| "vulnerable" | 0.60 | 0.40-0.70 | 0.90 | 0.30-0.60 | 0.40 | 0.50-0.70 |
| "sick" | 0.60 | 0.10-0.40 | 0.20 | 0.30-0.60 | 0.30 | 0.70-0.90 |
| "gloomy" | 0.70 | 0.30-0.50 | 0.40 | 0.55-0.80 | 0.40 | 0.75-1.00 |
| "..." | ... | ... | ... | ... | ... | ... |

SYSTEMS AND METHODS FOR PROCESSING NUANCES IN NATURAL LANGUAGE

TECHNOLOGICAL FIELD

Example embodiments of the present disclosure relate generally to natural language processing and, more particularly, to systems and methods for processing nuances in natural language.

BACKGROUND

The inventors have discovered problems with existing mechanisms for processing nuances in natural language. Through applied effort, ingenuity, and innovation, the inventors has solved many of these identified problems by developing solutions embodied by the present disclosure and described in detail below.

BRIEF SUMMARY

Systems, apparatuses, methods, and computer program products are disclosed herein for processing electronic information indicative of natural language, such as speech-based or text-based conversations, using a natural language processing (NLP) system that comprises natural language identification (NLI) circuitry, exogenous event identification (EEI) circuitry, natural language attribute (NLA) circuitry, and natural language transliteration (NLT) circuitry. The NLP system provided herein solves the above problems by processing nuances in natural language based on exogenous events, natural language attributes, tone, previous natural language, subsequent natural language, or a combination thereof.

In one example embodiment, a system is provided for processing electronic information indicative of natural language. The system may comprise NLI circuitry configured to receive first electronic information indicative of a sequence of words provided by a user. The sequence of words may comprise a first word in a first natural language, and the first word may correspond to a plurality of possible translations in a second natural language. The NLI circuitry may be further configured to generate a first identification of the first word based on the first electronic information and generate a second identification of the first natural language based on the first electronic information. The system may further comprise EEI circuitry configured to receive second electronic information indicative of an exogenous event and generate a third identification representing the exogenous event based on the second electronic information. The system may further comprise NLA circuitry in communication with the NLI circuitry and the EEI circuitry. The NLA circuitry may be configured to generate one or more natural language attribute data sets based on the first identification of the first word, the second identification of the first natural language, and the third identification representing the exogenous event. Each of the one or more natural language attribute data sets may comprise attribute data for a set of attributes associated with the first word. The system may further comprise NLT circuitry in communication with the NLA circuitry. The NLT circuitry may be configured to generate, based on the one or more natural language attribute data sets, a natural language transliteration data set comprising correlation data for each of the plurality of possible translations. The NLT circuitry may be further configured to generate, based on the natural language transliteration data set, a translation of the first word in the second natural language.

In another example embodiment, an apparatus is provided for processing electronic information indicative of natural language. The apparatus may comprise NLI circuitry configured to receive first electronic information indicative of a sequence of words provided by a user. The sequence of words may comprise a first word in a first natural language, and the first word may correspond to a plurality of possible translations in a second natural language. The NLI circuitry may be further configured to generate a first identification of the first word based on the first electronic information and generate a second identification of the first natural language based on the first electronic information. The apparatus may further comprise EEI circuitry configured to receive second electronic information indicative of an exogenous event and generate a third identification representing the exogenous event based on the second electronic information. The apparatus may further comprise NLA circuitry in communication with the NLI circuitry and the EEI circuitry. The NLA circuitry may be configured to generate one or more natural language attribute data sets based on the first identification of the first word, the second identification of the first natural language, and the third identification representing the exogenous event. Each of the one or more natural language attribute data sets may comprise attribute data for a set of attributes associated with the first word. The apparatus may further comprise NLT circuitry in communication with the NLA circuitry. The NLT circuitry may be configured to generate, based on the one or more natural language attribute data sets, a natural language transliteration data set comprising correlation data for each of the plurality of possible translations. The NLT circuitry may be further configured to generate, based on the natural language transliteration data set, a translation of the first word in the second natural language.

In yet another example embodiment, a method is provided for processing electronic information indicative of natural language. The method may comprise receiving, by NLI circuitry, first electronic information indicative of a sequence of words provided by a user. The sequence of words may comprise a first word in a first natural language, and the first word may correspond to a plurality of possible translations in a second natural language. The method may further comprise identifying, by the NLI circuitry, the first word based on the first electronic information. The method may further comprise identifying, by the NLI circuitry, the first natural language based on the first electronic information. The method may further comprise receiving, by EEI circuitry, second electronic information indicative of an exogenous event. The method may further comprise identifying, by the EEI circuitry, the exogenous event based on the second electronic information. The method may further comprise generating, by NLA circuitry in communication with the NLI circuitry and the NLA circuitry, one or more natural language attribute data sets based on the identified first word, the identified first language, and the identified exogenous event. Each of the one or more natural language attribute data sets may comprise attribute data for a set of attributes associated with the first word. The method may further comprise generating, by NLT circuitry in communication with the NLA circuitry, a natural language transliteration data set based on the one or more natural language attribute data sets. The natural language transliteration data set may comprise correlation data for each of the plurality of possible translations. The method may further comprise generating, by the NLT circuitry based on the natural language transliteration data set, a translation of the first word in the second natural language.

In yet another example embodiment, a computer program product is provided for processing electronic information indicative of natural language. The computer program product may comprise at least one non-transitory computer-readable storage medium having computer-executable program code stored therein. The computer-executable program code may comprise program code instructions configured to receive first electronic information indicative of a sequence of words provided by a user. The sequence of words may comprise a first word in a first natural language, and the first word may correspond to a plurality of possible translations in a second natural language. The program code instructions may be further configured to generate a first identification of the first word based on the first electronic information. The program code instructions may be further configured to generate a second identification of the first natural language based on the first electronic information. The program code instructions may be further configured to receive second electronic information indicative of an exogenous event. The program code instructions may be further configured to generate a third identification representing the exogenous event based on the second electronic information. The program code instructions may be further configured to generate one or more natural language attribute data sets based on the first identification of the first word, the second identification of the first natural language, and the third identification representing the exogenous event. Each of the one or more natural language attribute data sets may comprise attribute data for a set of attributes associated with the first word. The program code instructions may be further configured to generate, based on the one or more natural language attribute data sets, a natural language transliteration data set comprising correlation data for each of the plurality of possible translations. The program code instructions may be further configured to generate, based on the natural language transliteration data set, a translation of the first word in the second natural language.

The foregoing brief summary is provided merely for purposes of summarizing some example embodiments illustrating some aspects of the present disclosure. Accordingly, it will be appreciated that the above-described embodiments are merely examples and should not be construed to narrow the scope of the present disclosure in any way. It will be appreciated that the scope of the present disclosure encompasses many potential embodiments in addition to those summarized herein, some of which will be described in further detail below.

BRIEF DESCRIPTION OF THE FIGURES

The accompanying figures, which are not necessarily drawn to scale, illustrate embodiments and features of the present disclosure. Together with the specification, including the brief summary above and the detailed description below, the accompanying figures serve to explain the embodiments and features of the present disclosure. The components illustrated in the figures represent components that may or may not be present in various embodiments or features of the disclosure described herein. Accordingly, some embodiments or features of the present disclosure may include fewer or more components than those shown in the figures while not departing from the scope of the disclosure.

FIGS. 5A to 5E illustrate example natural language attribute data sets in accordance with some example embodiments described herein;

FIGS. 6A to 6C illustrate example natural language transliteration data sets in accordance with some example embodiments described herein;

DETAILED DESCRIPTION

Figure 1:
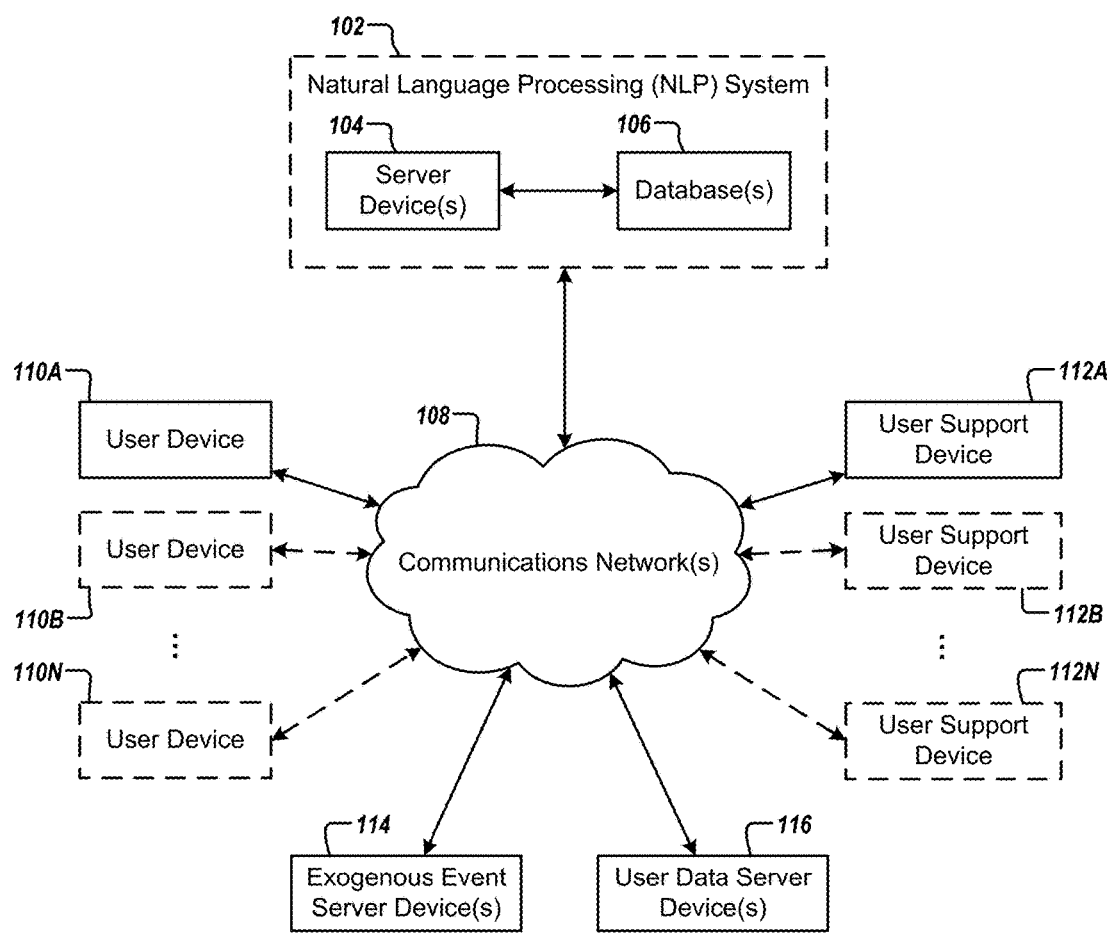
FIG. 1 illustrates a system diagram of a set of devices that may be involved in some example embodiments described herein.

Some embodiments of the present disclosure will now be described more fully hereinafter with reference to the accompanying figures, in which some, but not all embodiments of the disclosures are shown. Indeed, these disclosures may be embodied in many different forms and should not be construed as limited to the embodiments set forth herein; rather, these embodiments are provided so that this disclosure will satisfy applicable legal requirements. Like numbers refer to like elements throughout.

Overview

As noted above, methods, apparatuses, systems, and computer program products are described herein that provide for processing electronic information indicative of natural language. Traditionally, users (e.g., customers) must interact with user support agents (e.g., customer service agents) by speaking in a common natural language, such as English. However, many users for whom English is a second language hesitate to speak in English and would rather communicate in their own native languages. In some embodiments, described herein, a natural language processing (NLP) system may be deployed to provide multilingual customer support with machine-generated translations based on electronic analyses of nuances in the natural language spoken or input by the user or user support agent. In some instances, the NLP system retains the nuances used while speaking in a natural language in translation between two natural languages. For example, the NLP system may recognize speech and detect a first language (e.g., English, Hindi, Spanish, Chinese, Russian, or any other language) being spoken by the user. Once the NLP system detects the first language being spoken by the user, the NLP system may transliterate the spoken language to a script in a language that is likely to be different from the first language. In many embodiments, the script used for the transliterated text is Roman script. The NLP system may use the transliterated text to translate the text in the first language to text in second language based on nuances in the first (spoken) language (and, in some instances, electronic information indicative of one or more exogenous events), process a response to the first (spoken) language in English, translate the response back to the detected language of the user, and read the response back to the user.

In some embodiments, the present disclosure relates to a software suite that can be deployed using hardware to process electronic information indicative of natural language, such as speech-based or text-based conversations between users and user support agents. The software suite may comprise a natural language identification (NLI) module, an exogenous event identification (EEI) module, a natural language attribute (NLA) module, and a natural language transliteration (NLT) module. The NLI module may obtain a sequence of words from a user and process the sequence of words to identify a word and a first natural language corresponding to the word. The EEI module may obtain electronic information indicative of an exogenous event and identify the exogenous event. The NLA module may obtain the identified word and natural language from the NLI module and the identified exogenous event from the EEI module and generate one or more natural language attribute data sets comprising attribute data for a set of attributes associated with the word. The NLT module may obtain data from the one or more natural language attribute data sets and generate a second natural language transliteration data set comprising correlation data for each of the plurality of possible translations of the word in another natural language. Subsequently, the NLT module may generate, based on the natural language transliteration data set, a translation of the word in the other natural language.

In some embodiments, the software suite may also have a speech-to-text (STT) module to obtain a sequence of words spoken by a user and transliterate the spoken sequence of words into text. The NLI module may obtain the text from STT module. In some embodiments, the software suite may also have a text-to-speech (TTS) module to obtain and vocalize text-based words, translations, and response signals. In some instances, the functionality of the TTS module may be comprised by the STT module as a feature thereof.

In some embodiments, the software suite may also have a natural language recognition (NLR) module to obtain the sequence of words and, when the sequence of words matches a template, generate a response signal based on the template. In some instances, when the sequence of words does not match a template, the NLR module may generate a response signal configured to request additional information in order to generate or update a template associated with the sequence of words. In some embodiments, the NLR module may generate, when a word in the sequence of words matches a template, a properly nuanced translation of the word based on the template. In some instances, when the word does not match a template, the NLR module may generate a response signal configured to request additional information in order to generate or update a template associated with the word.

In some embodiments, one or more of these modules may be hosted locally by a user device or a user support device. For example, the NLI module, the EEI module, the NLA module, the NLT module, the STT module, the TTS module, the NLR module, any other module, or any combination thereof may be hosted locally by a user device or a user support device that has been provided with specialized computerized components. In some embodiments, one or more of these modules may be hosted remotely (e.g., by one or more separate devices or one or more cloud servers) and thus need not reside on the user device or user support device. Thus, some or all of the functionality described herein may be provided by a third party. For example, when remotely provisioning a user support device, the user support device may access one or more third party modules via a digitizer and a telephone module, a Wi-Fi module, a software phone module, or any sort of networked connection that facilitates transmission of digitized speech to the STT module. In turn, the STT module may be connected to the other modules, such as the NLI module.

In some embodiments, the NLP system described herein provides for improved translation from one language to another. In some instances, the NLP system described herein may improve the ability of English speaking customer support representatives to serve non-English speakers by improving the nuance of translations from non-English languages into English and vice versa.

In some embodiments, the NLP system may generate an initial identification of a word spoken by a customer in the customer's language. The NLP system may separately gather a set of exogenous events. The set of exogenous events may indicate, for example, that the stock market is not performing well. The NLP system then may populate values and weightings for the identified word in each of a variety of NLA data sets, such as one NLA data set relating to the emotion of the customer (e.g., anger, joy, fear, surprise, etc.), one NLA data set relating to the topic of discussion (e.g., finance, social, personal, political), and one NLA data set relating to the customer's sentiment (e.g., a polarity, perspective, and purpose associated with the word). The NLP system's calculation of the values and weightings is affected by the nature of the gathered set of exogenous events (e.g., if the stock market has fallen, the NLP system may introduce a bias towards anger or fear when identifying the emotion of the customer's speech). Then, the NLP system may aggregate the values and weightings for the word from each NLA data set and use the aggregation in connection with a NLT data set to identify, from a set of possibly corresponding English language words, the most appropriate English language word corresponding to the word spoken by the customer. In some embodiments, the NLT system may perform this identification step using a mean absolute deviation (MAD) technique. By using this particular combination of speech analysis and improving it by also taking into account the existence of exogenous events that are likely to affect a customer's intonation and speech patterns, the NLT system is able to more actually translate non-English words that have multiple plausible translations into properly nuanced English text.

In some embodiments, a user or user support agent may provide a sequence of words in a first natural language, such as Hindi. The sequence of words may include a word that corresponds to a plurality of possible translations in a second natural language, such as English. The following examples are provided to illustrate, in a non-limiting manner, some of the operations and capabilities of the NLP system disclosed herein.

In one example, a user may speak or input the sequence of words "Bahut sahi" in the natural language of Hindi. A conventional English translation may be "Very right." In contrast, the NLP system disclosed herein may process nuances in the sequence of words spoken or input by the user to generate the proper translation "Very good" in the natural language of English.

In another example, a user support agent may speak or type the sequence of words "Kyah haal hai?" in the natural language of Hindi, and a user may speak or input the sequence of words "Kamzor hai" in the natural language of Hindi. Conventional English translations may respectively be "What is it?" and "It is weak." In contrast, the NLP system disclosed herein may process nuances in the sequences of words respectively spoken or input by the user support agent and the user to generate the proper translations "How are you?" and "Things are gloomy" in the natural language of English in view of the exogenous event "The Stock market has had a bad day on day the conversation is taking place."

In another example, a user may speak or input the sequence of words "Aap ka kya haal hai" in the natural language of Hindi. A conventional English translation may be "What are you doing??" In contrast, the NLP system disclosed herein may process nuances in the spoken or typed sequence of words spoken or input by the user to generate the proper translation "How are you?" in the natural language of English.

In another example, a user may speak or input the sequence of words "koee baat naheen" in the natural language of Hindi. A conventional English translation may be "No answer." In contrast, the NLP system disclosed herein may process nuances in the sequence of words spoken or input by the user to generate the proper translation "You are welcome" or "No problem" in the natural language of English.

In another example, a user may speak or input the sequence of words "Yeh khabhaar mera dimag kha raha hai" in the natural language of Hindi. A conventional English translation may be "This mind is eating my brain." In contrast, the NLP system disclosed herein may process nuances in the sequence of words spoken or input by the user to generate the proper translation "This news is unsettling me" or "This event is worrying me" in the natural language of English.

In another example, a user may speak or input the sequence of words corresponding to the following English construct amongst Hindi speakers: "My mortgage is sitting on my head." The NLP system disclosed herein may process nuances in this English construct to generate the proper translation "My mortgage is stressing me out" in the natural language of English.

There are many advantages of these and other embodiments described herein, such as: reducing interaction time; making transactions easier for users, especially if they are native speakers of a natural language different from the natural language spoken by the user support agent; reducing queues; improving user support; improving customer experience; promoting comfort because users can speak in their native language using the nuances with which they are accustomed; and promoting appeal because user support agents have the ability to understand users in any language with nuances intact. In addition, the NLP system may significantly improve natural language processing by handling nuances in spoken language and then using those nuances in natural language generation.

Definitions

As used herein, the terms "data," "content," "information," "electronic information," "signal," "command," and similar terms may be used interchangeably to refer to data capable of being transmitted, received, and/or stored in accordance with embodiments of the present disclosure. Thus, use of any such terms should not be taken to limit the spirit or scope of embodiments of the present disclosure. Further, where a first computing device or circuitry is described herein to receive data from a second computing device or circuitry, it will be appreciated that the data may be received directly from the second computing device or circuitry or may be received indirectly via one or more intermediary computing devices or circuitries, such as, for example, one or more servers, relays, routers, network access points, base stations, hosts, and/or the like, sometimes referred to herein as a "network." Similarly, where a first computing device or circuitry is described herein as sending data to a second computing device or circuitry, it will be appreciated that the data may be sent directly to the second computing device or circuitry or may be sent indirectly via one or more intermediary computing devices or circuitries, such as, for example, one or more servers, remote servers, cloud-based servers (e.g., cloud utilities), relays, routers, network access points, base stations, hosts, and/or the like.

The term "comprising" means including but not limited to, and should be interpreted in the manner it is typically used in the patent context. Use of broader terms such as comprises, includes, and having should be understood to provide support for narrower terms such as consisting of, consisting essentially of, and comprised substantially of.

The phrases "in one embodiment," "according to one embodiment," and the like generally mean that the particular feature, structure, or characteristic following the phrase may be included in at least one embodiment of the present disclosure, and may be included in more than one embodiment of the present disclosure (importantly, such phrases do not necessarily refer to the same embodiment).

The word "example" is used herein to mean "serving as an example, instance, or illustration." Any implementation described herein as "example" is not necessarily to be construed as preferred or advantageous over other implementations.

If the specification states a component or feature "may," "can," "could," "should," "would," "preferably," "possibly," "typically," "optionally," "for example," "often," or "might" (or other such language) be included or have a characteristic, that particular component or feature is not required to be included or to have the characteristic. Such component or feature may be optionally included in some embodiments, or it may be excluded.

As used herein, the term "transmitter" refers to any component that can generate radio waves for communication purposes while a "receiver" is used to generally refer to any component that can receive radio waves and convert the information into useable form. A "transceiver" generally refers to a component that can both generate radio waves and receive radio waves and is thus contemplated when either a transmitter or a receiver is discussed.

The terms "processor" and "processing circuitry" are used herein to refer to any programmable microprocessor, microcomputer or multiple processor chip or chips that can be configured by software instructions (applications) to perform a variety of functions, including the functions of the various embodiments described above. In some devices, multiple processors may be provided, such as one processor dedicated to wireless communication functions and one processor dedicated to running other applications. Software applications may be stored in the internal memory before they are accessed and loaded into the processors. The processors may include internal memory sufficient to store the application software instructions. In many devices the internal memory may be a volatile or nonvolatile memory, such as flash memory, or a mixture of both. The memory may also be located internal to another computing resource (e.g., enabling computer readable instructions to be downloaded over the Internet or another wired or wireless connection).

For the purposes of this description, a general reference to "memory" refers to memory accessible by the processors including internal memory or removable memory plugged into the device, remote memory (e.g., cloud storage), and/or memory within the processors themselves. For instance, memory may be any non-transitory computer readable medium having computer readable instructions (e.g., computer program instructions) stored thereof that are executable by a processor.

The term "computing device" is used herein to refer to any one or all of programmable logic controllers (PLCs), programmable automation controllers (PACs), industrial computers, desktop computers, personal data assistants (PDAs), laptop computers, tablet computers, smart books, palm-top computers, personal computers, smartphone, headset, smartwatch, and similar electronic devices equipped with at least a processor configured to perform the various operations described herein. Devices such as smartphones, laptop computers, tablet computers, headsets, and smartwatches are generally collectively referred to as mobile devices.

The term "server" is used to refer to any computing device capable of functioning as a server, such as a master exchange server, web server, mail server, document server, or any other type of server. A server may be a dedicated computing device or a computing device including a server module (e.g., an application which may cause the computing device to operate as a server). A server module (e.g., server application) may be a full function server module, or a light or secondary server module (e.g., light or secondary server application) that is configured to provide synchronization services among the dynamic databases on computing devices. A light server or secondary server may be a slimmed-down version of server type functionality that can be implemented on a computing device, such as a smart phone, thereby enabling it to function as an Internet server (e.g., an enterprise e-mail server) only to the extent necessary to provide the functionality described herein.

The terms "circuitry," "module," "software module," "utility," "cloud utility," "suite," and "software suite" (or other such terms) should be understood broadly to include hardware. In some embodiments, these terms may also include software for configuring the hardware. For example, in some embodiments, "circuitry" may include processing circuitry, memory, communications circuitry, and/or input-output circuitry. In some embodiments, other elements of the present disclosure may provide or supplement the functionality of particular circuitry, modules, utilities, or suites.

Having set forth a series of definitions called-upon throughout this application, an example system architecture is described below for implementing example embodiments and features of the present disclosure.

System Architecture

Methods, systems, apparatuses, and computer program products of the present disclosure may be embodied by any of a variety of devices. For example, the method, system, apparatus, and computer program product of an example embodiment may be embodied by a networked device, such as one or more servers, remote servers, cloud-based servers (e.g., cloud utilities), or other network entities, configured to communicate with one or more devices, such as one or more user devices, user support devices, exogenous event server devices, user data server devices, or a combination thereof. Example embodiments of the user devices and user support devices include any of a variety of stationary or mobile terminals, such as a portable digital assistant (PDA), mobile telephone, smartphone, laptop computer, tablet computer, a desktop computer, an electronic workstation, a kiosk, an automated transaction machine (ATM), or any combination of the aforementioned devices.

FIG. 1 illustrates a system diagram of a set of devices that may be involved in some example embodiments described herein. In this regard, FIG. 1 discloses an example computing system 100 within which embodiments of the present disclosure may operate. As illustrated, a natural language processing (NLP) system 102 may be connected to one or more server devices 104 in communication with one or more databases 106. The NLP system 102 may be connected to one or more user devices 110A-110N, one or more user support devices 112A-112N, one or more exogenous event server devices 114, and one or more user data server devices 116 through one or more communications networks 108. In some embodiments, the NLP system 102 may be configured to identify a word in a first language provided by a user of user device 110 or user support device 112 and generate a translation of the word in a second language as described in further detail below.

The NLP system 102 may be embodied as a computer or computers as known in the art. The NLP system 102 may provide for receiving first electronic information indicative of a sequence of words provided by a user from various sources, including but not necessarily limited to the user devices 110A-110N, the user support devices 112A-112N, or both. The NLP system 102 may provide for receiving second electronic information indicative of an exogenous event from various sources, including but not necessarily limited to the one or more exogenous event server devices 114. The NLP system 102 may provide for receiving a user data set associated with the user that provided the sequence of words from various sources, including but not necessarily limited to the one or more user data server devices 116. In some embodiments, the NLP system 102 may provide for generating one or more natural language attribute data sets based on the identified first word, the identified first language, and the identified one or more exogenous events and, in some instances, also based on the user data set, the identified tone of the sequence of words, and other identified words in the sequence of words. Each of the one or more natural language attribute data sets may comprise attribute data for a set of attributes associated with the first word. In some embodiments, the NLP system 102 may provide for generating, based on the one or more natural language attribute data sets, a natural language transliteration data set comprising correlation data for each of the plurality of possible translations. In some embodiments, the NLP system 102 may provide for generating, based on the natural language transliteration data set, a translation of the first word in the second natural language. For example, "weak" is the conventional English translation of the Hindi word "kamzor." In contrast, the NLP system 102 may provide for generating the translation "gloomy" in the second natural language of English for the first word "kamzor" in the first natural language of Hindi based on the circumstances surrounding the conversation, such as one or more identified exogenous events associated with the sequence of words provided by the user, the user data set associated with the user who provided the sequence of words, the identified tone of the sequence of words, other identified words in the sequence of words, any other suitable information, or any combination thereof.

The one or more server devices 104 may be embodied as one or more servers, remote servers, cloud-based servers (e.g., cloud utilities), processors, or any other suitable server devices, or any combination thereof. The one or more server devices 104 receive, process, generate, and transmit data, signals, and electronic information to facilitate the operations of the NLP system 102.

The one or more databases 106 may be embodied as one or more data storage devices such as a Network Attached Storage (NAS) device or devices, or as a separate database server or servers. The one or more databases 106 include information accessed and stored by the NLP system 102 to facilitate the operations of the NLP system 102. For example, the one or more databases 106 may store user account credentials for users of user devices 110A-110N or user support devices 112A-112N, and/or data regarding device characteristics of various user devices 110A-110N or user support devices 112A-112N. For example, the one or more databases 106 may comprise one or more user data sets (e.g., name, address, account information, and other user data) associated with users of user devices 110A-110N or user support devices 112A-112N.

The one or more user devices 110A-110N may be embodied by any computing device known in the art. In some embodiments, the user devices 110A-110N may comprise or be coupled to one or more laptop computers, smartphones, netbooks, tablet computers, wearable devices desktop computers, electronic workstations, kiosks, ATMs, or the like. Information received by the NLP system 102 from these devices may be provided in various forms and via various methods. It will be understood, however, that in some embodiments, the user devices 110A-110N need not themselves be user devices, but may be peripheral devices communicatively coupled to user devices. While embodiments described herein may utilize the microphones, speakers, and/or cameras contained in user devices 110A-110N, embodiments described herein also enable voice communication with user devices 110A-110N that lack such components.

The one or more user support devices 112A-112N may be embodied by any computing device known in the art. Information received by the NLP system 102 from these devices may be provided in various forms and via various methods. For example, the user support devices 112A-112N may be laptop computers, smartphones, netbooks, tablet computers, wearable devices, desktop computers, electronic workstations, kiosks, or the like, and the information may be provided through various modes of data transmission provided by these consumer devices.

In embodiments where a user device 110 or user support device 112 is a mobile device, such as a smartphone or tablet, the mobile device may execute an "app" (e.g., a thin-client application) to interact with the NLP system 102. Such apps are typically designed to execute on mobile devices, such as tablets or smartphones. For example, an app may be provided that executes on mobile device operating systems such as Apple Inc.'s iOS, Google LLC's Android®, or Microsoft Corporation's Windows®. These platforms typically provide frameworks that allow apps to communicate with one another and with particular hardware and software components of mobile devices. For example, the mobile operating systems named above each provide frameworks for interacting with location services circuitry, wired and wireless network interfaces, user contacts, and other applications in a manner that allows for improved interactions between apps while also preserving the privacy and security of individual users. In some embodiments, a mobile operating system may also provide for improved communication interfaces for interacting with external devices (e.g., user devices, user support devices). Communication with hardware and software modules executing outside of the app is typically provided via application programming interfaces (APIs) provided by the mobile device operating system.

The one or more exogenous event server devices 114 may be embodied as one or more servers, remote servers, cloud-based servers (e.g., cloud utilities), processors, or any other suitable server devices, or any combination thereof. The one or more exogenous event server devices 114 receive, process, generate, and transmit data, signals, and electronic information to facilitate the operations of the NLP system 102. In some embodiments, the NLP system 102 may receive the second electronic information indicative of an exogenous event from the one or more exogenous event server devices 114. For example, the second electronic information may be indicative of various exogenous events, such as "stock market is not performing well," "outbreak of Zika," "yesterday was the Super Bowl," "steady U.S. job growth," any other exogenous event, or any combination thereof. The second electronic information may be indicative of various exogenous events associated with a user (e.g., a user of user device 110), such as "looming cash flow crisis," "credit card debt," "recent bonus," any other exogenous event, or any combination thereof. In some embodiments, the NLP system 102 may transmit a request for information indicative of an exogenous event to one or more exogenous event server devices 114, which may receive the request and transmit the second electronic information indicative of the exogenous event to the NLP system 102. For example, the NLP system 102 may transmit a request for electronic information indicative of the industry or industries associated with the exogenous event "stock market is not performing well." One or more exogenous event server devices 114 may receive the request and transmit the second electronic information indicative of the industry or industries associated with the exogenous event "stock market is not performing well" to the NLP system 102.

The one or more user data server devices 116 may be embodied as one or more servers, remote servers, cloud-based servers (e.g., cloud utilities), processors, or any other suitable server devices, or any combination thereof. The one or more user data server devices 116 receive, process, generate, and transmit data, signals, and electronic information to facilitate the operations of the NLP system 102. In some embodiments, the one or more user data server devices 116 may comprise one or more user data sets (e.g., name, address, account information, and other user data) associated with users of user devices 110A-110N or user support devices 112A-112N. In some embodiments, the one or more user data server devices 116 may comprise one or more user event data sets (e.g., calendar events, social media postings, career milestones such as bonuses or promotions, job losses, medical information, illnesses or deaths of family members, and other user event data) associated with users of user devices 110A-110N or user support devices 112A-112N. In some embodiments, the NLP system 102 may receive electronic information associated with the user, such as a comprise a user data set, a user event data set, or both associated with a user that provided a sequence of words.

Additionally or alternatively, the user devices 110A-110N, the user support devices 112A-112N, the one or more exogenous event server devices 114, the one or more user data server devices 116, or any combination thereof may interact with the NLP system 102 over one or more communications networks 108. As yet another example, the user devices 110A-110N and/or the user support devices 112A-112N may include various hardware or firmware designed to interface with the NLP system 102. For example, an example user device 110A may be a user device modified to communicate with the NLP system 102, and another example user device 110B may be a purpose-built device, such as an electronic translation device offered for the primary purpose of facilitating communication between a user device and a user support device via the NLP system 102. In another example, the user support device 112 may be a purpose-built device such as a chatbot offered for the primary purpose of communicating with the NLP system 102.

As a foundation for some embodiments, the NLP system 102 may provide for receiving first electronic information indicative of a sequence of words provided by a user from various sources, including but not necessarily limited to the user devices 110A-110N, the user support devices 112A-112N, or both. For example, the sequence of words may comprise the words "chintith," "durble," "aalochaneey," and "kamzor" in the natural language of Hindi.

The NLP system 102 may provide for generating an identification of the first word based on the first electronic information, and the NLP system 102 may provide for generating a second identification of the first natural language based on the first electronic information. For example, the NLP system 102 may provide for identifying the word "kamzor" in the first natural language of Hindi based on a sequence of words that comprises the words "chintith," "durble," "aalochaneey," and "kamzor." In some instances, the first word may correspond to a plurality of possible translations in a second natural language. For example, the first word "kamzor" in the first natural language of Hindi may correspond to the possible translations "weak," "vulnerable," "sick," and "gloomy" in the second natural language of English. In some embodiments, the NLP system 102 may provide for generating an identification of a second word based on the first electronic information, such as the word "durble" in the first natural language of Hindi based on a sequence of words that comprises the words "chintith," "durble," "aalochaneey," and "kamzor." In some embodiments, the NLP system 102 may provide for generating an identification of a tone of the sequence of words based on the first electronic information. For example, the NLP system 102 may provide for identifying the tone "sad" based on a sequence of words having a relatively low pitch, a relatively slow pace or speed, a relative emphasis or stress on a particular word such as "kamzor," relative pauses between words, any other suitable information, or any combination thereof. In some embodiments, the NLP system 102 may provide for generating an identification of a tone of a particular word in the sequence of words based on the first electronic information. For example, the NLP system 102 may provide for identifying the tone "angry" based on a word having a relatively high pitch, a relatively fast pace or speed, a relative emphasis or stress on the word, relative pauses before or after the word, any other suitable information, or any combination thereof.

In some embodiments, the NLP system 102 may provide for receiving second electronic information indicative of an exogenous event. The exogenous event may correspond to a global event, a regional event, a user event, any other suitable exogenous event, or any combination thereof. For example, the second electronic information may comprise electronic information indicative of an exogenous event such as "stock market is not performing well." In another example, the second electronic information may comprise electronic information indicative of exogenous events associated with the user's geolocation (e.g., for a user located or domiciled in, or a citizen of, the United States), such as "U.S. stock market is not performing well," "outbreak of Zika near the user's home address," "yesterday was the Super Bowl," "steady U.S. job growth," any other exogenous event, or any combination thereof. In another example, the second electronic information may comprise electronic information indicative of one or more exogenous events associated with the user, such as "looming cash flow crisis," "credit card debt," "recent bonus," any other exogenous event, or any combination thereof. In some embodiments, the NLP system 102 may receive the second electronic information from server device 104, database 106, user device 110, user support device 112, exogenous event server device 114, or user data server device 116. For example, the server device 104 may transmit the second electronic information to NLP system 102. In other embodiments, the NLP system 102 may receive the second electronic information from exogenous event server device 114 in response to a request transmitted by NLP system 102 to exogenous event server device 114.

In some embodiments, the NLP system 102 may provide for generating an identification of one or more exogenous events based on the second electronic information. For example, the NLP system 102 may provide for identifying the exogenous event "stock market is not performing well." In another example, the NLP system 102 may provide for identifying exogenous events associated with the user's geolocation (e.g., for a user located or domiciled in, or a citizen of, the United States), such as "U.S. stock market is not performing well," "outbreak of Zika near the user's home address," "yesterday was the Super Bowl," "steady U.S. job growth," any other exogenous event, or any combination thereof. In another example, the NLP system 102 may provide for identifying exogenous events associated with the user, such as "looming cash flow crisis," "credit card debt," "recent bonus," any other exogenous event, or any combination thereof. In some instances, the NLP system 102 may further identify the exogenous event based on a response received from a remote server (e.g., exogenous event server device 114) after transmitting to the remote server a request for additional information associated with the exogenous event, such as a request for electronic information indicative of the industry or industries associated with the exogenous event "stock market is not performing well."

In some embodiments, the NLP system 102 may provide for generating one or more natural language attribute data sets based on the identified first word, the identified first language, and the identified exogenous event. In some instances, the NLP system 102 may provide generating the one or more natural language attribute data sets also based on an identified second word. In some instances, the NLP system 102 may provide generating the one or more natural language attribute data sets also based on an identified tone. In some embodiments, each of the one or more natural language attribute data sets may comprise attribute data for a set of attributes associated with the first word. In some instances, the attribute data may comprise a plurality of attribute values for each of the attributes.

In some embodiments, the NLP system 102 may provide for generating a natural language transliteration data set based on the one or more natural language attribute data sets. In some embodiments, the natural language transliteration data set may comprise correlation data for each of the plurality of possible translations. In some instances, the correlation data may comprise one or more deviation data elements for each of the plurality of possible translations. In some instances, a deviation data element may comprise a deviation distance value and a deviation range value.

In some embodiments, the NLP system 102 may provide for generating, based on the natural language transliteration data set, a translation of the first word in the second natural language. For example, the NLP system 102 may provide for generating, based on the natural language transliteration data set, the translation "gloomy" for the first word "kamzor" in the second natural language of English. In another example, the NLP system 102 may provide for generating the translation based on a mean absolute deviation technique or a median absolute deviation technique. In some embodiments, the NLP system 102 may provide for generating a translation "gloomy" in the second natural language of English for the first word "kamzor" based on the circumstances surrounding the conversation, such as one or more identified exogenous events associated with the sequence of words provided by the user, the identified tone of the sequence of words, other identified words in the sequence of words, any other suitable information, or any combination thereof. In some embodiments, the NLP system 102 may provide for generating the translation by: generating a mean absolute deviation value for each of the plurality of possible translations; selecting one of the plurality of possible translations having a mean absolute deviation value less than all others of the plurality of possible translations; and generating the translation based on the selected possible translation. For example, the NLP system 102 may provide for generating the translation "gloomy" by: generating a mean absolute deviation value for each of a plurality of possible translations in the natural language of English for the first word "kamzor" in the natural language of Hindi; selecting the possible translation "gloomy" having a mean absolute deviation value less than all others of the plurality of possible translations; and generating the translation based on the selected possible translation. In some embodiments, the NLP system 102 may provide transmitting the translation to the user device 110 or the user support device 112 for audio output of a vocal representation of the translation.

Example Implementing Apparatus

Figure 2:
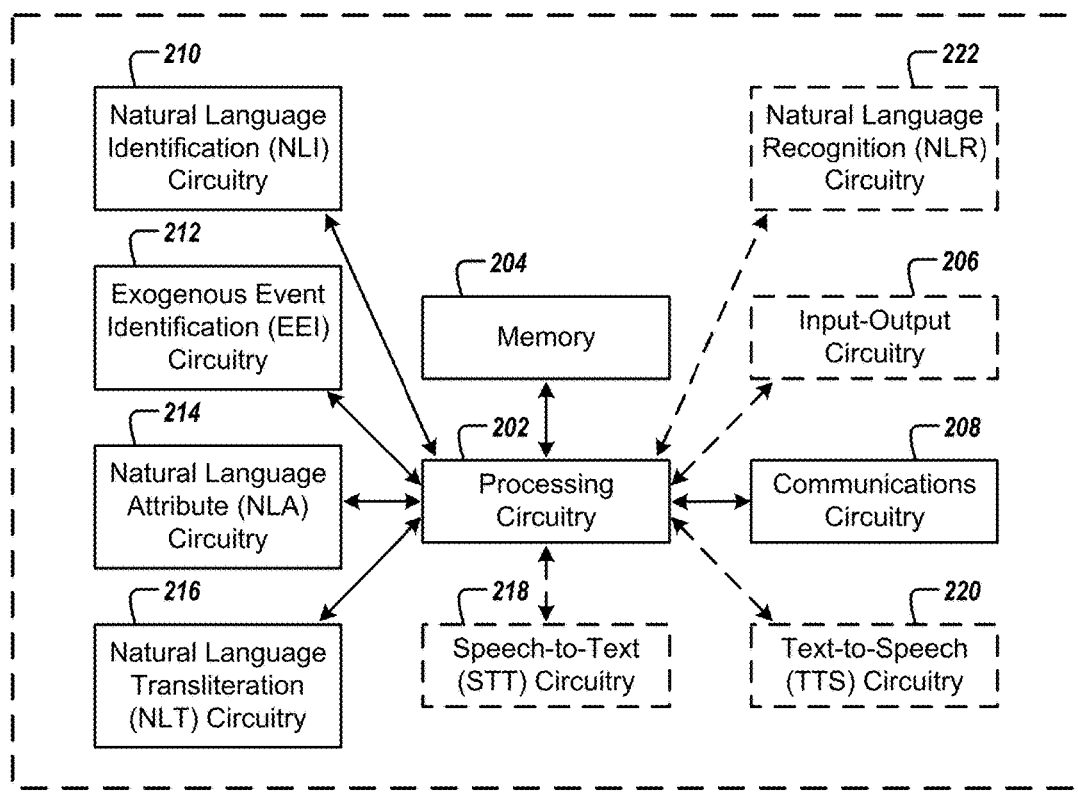
FIG. 2 illustrates a schematic block diagram of example circuitry that may perform various operations in accordance with some example embodiments described herein.

The NLP system 102 described with reference to FIG. 1 may be embodied by one or more computing systems, such as apparatus 200 shown in FIG. 2. As illustrated in FIG. 2, the apparatus 200 may include processing circuitry 202, memory 204, input-output circuitry 206, communications circuitry 208, natural language identification (NLI) circuitry 210, exogenous event identification (EEI) circuitry 212, natural language attribute (NLA) circuitry 214, natural language transliteration (NLT) circuitry 216, speech-to-text (STT) circuitry 218, text-to-speech (TTS) circuitry 220, and natural language recognition (NLR) circuitry 222. The apparatus 200 may be configured to execute the operations described above with respect to FIG. 1 and below with respect to FIGS. 3-10. Although some of these components 202-222 are described with respect to their functional capabilities, it should be understood that the particular implementations necessarily include the use of particular hardware to implement such functional capabilities. It should also be understood that certain of these components 202-222 may include similar or common hardware. For example, two sets of circuitry may both leverage use of the same processor, network interface, storage medium, or the like to perform their associated functions, such that duplicate hardware is not required for each set of circuitry. In some embodiments, apparatus 200 may be partially or wholly embodied as a chat bot or chat platform. For example, apparatus 200 may be a chat bot located at a bank.

The use of the term "circuitry" as used herein with respect to components of the apparatus 200 therefore includes particular hardware configured to perform the functions associated with respective circuitry described herein. Of course, while the term "circuitry" should be understood broadly to include hardware, in some embodiments, circuitry may also include software for configuring the hardware. For example, in some embodiments, "circuitry" may include processing circuitry, storage media, network interfaces, input-output devices, and other components. In some embodiments, other elements of the apparatus 200 may provide or supplement the functionality of particular circuitry. For example, the processing circuitry 202 may provide processing functionality, memory 204 may provide storage functionality, and communications circuitry 208 may provide network interface functionality, among other features.

In some embodiments, the processing circuitry 202 (and/or co-processor or any other processing circuitry assisting or otherwise associated with the processor) may be in communication with the memory 204 via a bus for passing information among components of the apparatus. The memory 204 may be non-transitory and may include, for example, one or more volatile and/or non-volatile memories. In other words, for example, the memory may be an electronic storage device (e.g., a computer readable storage medium). The memory 204 may be configured to store information, data, content, applications, instructions, or the like, for enabling the apparatus to carry out various functions in accordance with example embodiments of the present disclosure. For example, the memory 204 may be configured to store query command signals, control signals, electronic information, response signals, and maps of the tree-structured menus of one or more user devices and/or updates thereof.

The processing circuitry 202 may be embodied in a number of different ways and may, for example, include one or more processing devices configured to perform independently. Additionally or alternatively, the processing circuitry 202 may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In an example embodiment, the processing circuitry 202 may be configured to execute instructions stored in the memory 204 or otherwise accessible to the processor. Alternatively or additionally, the processor may be configured to execute hard-coded functionality. As such, whether configured by hardware or software methods, or by a combination of hardware with software, the processor may represent an entity (e.g., physically embodied in circuitry) capable of performing operations according to an embodiment of the present disclosure while configured accordingly. As another example, when the processor is embodied as an executor of software instructions, the instructions may specifically configure the processor to perform the algorithms and/or operations described herein when the instructions are executed.

In some embodiments, the apparatus 200 may include input-output circuitry 206 that may, in turn, be in communication with processing circuitry 202 to provide output to the user and, in some embodiments, to receive an indication of a user input such as a command provided by a user. The input-output circuitry 206 may comprise a user interface and may include a display that may include a web user interface, a mobile application, a client device, or any other suitable hardware or software. In some embodiments, the input-output circuitry 206 may also include a keyboard, a mouse, a joystick, a touch screen, touch areas, soft keys, a microphone, a speaker, or other input-output mechanisms. The processing circuitry 202 and/or input-output circuitry 206 (which may utilize the processing circuitry 202) may be configured to control one or more functions of one or more user interface elements through computer program instructions (e.g., software, firmware) stored on a memory (e.g., memory 204).

The communications circuitry 208 may be any device or circuitry embodied in either hardware or a combination of hardware and software that is configured to receive and/or transmit data from or to a network and/or any other device, circuitry, or module in communication with the apparatus 200. In this regard, the communications circuitry 208 may include, for example, a network interface for enabling communications with a wired or wireless communication network. For example, the communications circuitry 208 may include one or more network interface cards, antennae, buses, switches, routers, modems, and supporting hardware and/or software, or any other device suitable for enabling communications via a network. In some embodiments, the communication interface may include the circuitry for interacting with the antenna(s) to cause transmission of signals via the antenna(s) or to handle receipt of signals received via the antenna(s). These signals may be transmitted by the apparatus 200 using any of a number of wireless personal area network (PAN) technologies, such as Bluetooth® v1.0 through v3.0, Bluetooth Low Energy (BLE), infrared wireless (e.g., IrDA), ultra-wideband (UWB), induction wireless transmission, or any other suitable technologies. In addition, it should be understood that these signals may be transmitted using Wi-Fi, Near Field Communications (NFC), Worldwide Interoperability for Microwave Access (WiMAX) or other proximity-based communications protocols.

The NLI circuitry 210 includes hardware components designed or configured to receive first electronic information indicative of a sequence of words provided by a user. These hardware components may, for instance, utilize communications circuitry 208 to communicate with a user device (e.g., one or more user devices 110A-110N), a user support device (e.g., one or more user support devices 112A-112N), an exogenous event server device (e.g., one or more exogenous event server devices 114), a user data server device (e.g., one or more user data server devices 116), EEI circuitry 212, NLA circuitry 214, NLT circuitry 216, STT circuitry 218, TTS circuitry 220, NLR circuitry 222, or any other suitable circuitry or device. For example, the NLI circuitry 210 may be in communication with a user device (e.g., user device 110), and thus configured to receive the first electronic information indicative of a sequence of words provided by a user. In some embodiments, the NLI circuitry 210 may receive the first electronic information from STT circuitry 218. The sequence of words may be any suitable sequence of words. For example, the sequence of words may comprise the words "chintith," "durble," "aalochaneey," and "kamzor." In some embodiments, the sequence of words may comprise a first word in a first natural language. For example, the sequence of words may comprise the word "kamzor" in the first natural language of Hindi. In some embodiments, the first word may correspond to a plurality of possible translations in a second natural language. For example, the first word "kamzor" in the first natural language of Hindi may correspond to the possible translations "weak," "vulnerable," "sick," and "gloomy" in the second natural language of English. It should also be appreciated that, in some embodiments, the NLI circuitry 210 may include a separate processor, specially configured field programmable gate array (FPGA), application specific interface circuit (ASIC), or cloud utility to perform the above functions.

In some embodiments, the NLI circuitry 210 may include hardware components designed or configured to identify, or generate identifications of, the first word and the first natural language based on the received first electronic information. For example, the NLI circuitry 210 may be configured to identify the first word "kamzor" and the first natural language of Hindi based on a sequence of words that comprises the words "chintith," "durble," "aalochaneey," and "kamzor." In some instances, the NLI circuitry 210 may be configured to identify a second word based on the first electronic information, such as "durble" based on the sequence of words that comprises the words "chintith," "durble," "aalochaneey," and "kamzor." In some embodiments, the NLI circuitry 210 may be configured to identify, based on the first electronic information, a tone of the sequence of words provided by the user. For example, the NLI circuitry 210 may be configured to identify the tone "sad" based on a sequence of words having a relatively low pitch, a relatively slow pace or speed, a relative emphasis or stress on a particular word such as "kamzor," relative pauses between words, any other suitable information, or any combination thereof. In some embodiments, the NLI circuitry 210 may include hardware components designed or configured to transmit the identified first word and the identified first language to the NLA circuitry 214, NLR circuitry 222, or any other suitable device or circuitry. In some instances, the NLI circuitry 210 may include hardware components designed or configured to transmit an identified second word in the sequence of words to the NLA circuitry 214, the NLR circuitry 222, or any other suitable device or circuitry. In some instances, the NLI circuitry 210 may include hardware components designed or configured to transmit an identified tone of the sequence of words to the NLA circuitry 214, the NLR circuitry 222, or any other suitable device or circuitry.

The EEI circuitry 212 includes hardware components designed or configured to receive second electronic information indicative of an exogenous event. These hardware components may, for instance, utilize communications circuitry 208 to communicate with a user device (e.g., one or more of user devices 110A-110N), a user support device (e.g., one or more of user support devices 112A-112N), an exogenous event server device (e.g., one or more exogenous event server devices 114), a user data server device (e.g., one or more user data server devices 116), NLI circuitry 210, NLA circuitry 214, NLT circuitry 216, STT circuitry 218, TTS circuitry 220, NLR circuitry 222, or any other suitable circuitry or device. For example, the EEI circuitry 212 may be in communication with an exogenous event server device (e.g., one or more exogenous event server devices 114), and thus configured to receive second electronic information indicative of one or more exogenous events. In some embodiments, EEI circuitry 212 may receive the second electronic information from exogenous event server device 114 in response to a request transmitted by EEI circuitry 212 to exogenous event server device 114. In other embodiments, the EEI circuitry 212 may receive the second electronic information from server device 104, database 106, user device 110, user support device 112, or user data server device 116. The exogenous event may correspond to a global event, a regional event, a user event, any other suitable exogenous event, or any combination thereof. For example, the second electronic information may comprise electronic information indicative of an exogenous event such as "stock market is not performing well." In another example, the second electronic information may comprise electronic information indicative of exogenous events associated with the user's geolocation (e.g., for a user located or domiciled in, or a citizen of, the United States), such as "U.S. stock market is not performing well," "outbreak of Zika near the user's home address," "yesterday was the Super Bowl," "steady U.S. job growth," any other exogenous event, or any combination thereof. In another example, the second electronic information may comprise electronic information indicative of one or more exogenous events associated with the user, such as "looming cash flow crisis," "credit card debt," "recent bonus," any other exogenous event, or any combination thereof. It should also be appreciated that, in some embodiments, the EEI circuitry 212 may include a separate processor, specially configured field programmable gate array (FPGA), application specific interface circuit (ASIC), or cloud utility to perform the above functions.

In some embodiments, the EEI circuitry 212 may include hardware components designed or configured to identify, or generate an identification of, one or more exogenous events based on the received second electronic information. For example, the EEI circuitry 212 may provide for identifying the exogenous event "stock market is not performing well." In another example, the EEI circuitry 212 may provide for identifying exogenous events associated with the user's geolocation (e.g., for a user located or domiciled in, or a citizen of, the United States), such as "U.S. stock market is not performing well," "outbreak of Zika near the user's home address," "yesterday was the Super Bowl," "steady U.S. job growth," any other exogenous event, or any combination thereof. In another example, the NLP system 102 may provide for identifying exogenous events associated with the user, such as "looming cash flow crisis," "credit card debt," "recent bonus," any other exogenous event, or any combination thereof. In some instances, the EEI circuitry 212 may further identify the exogenous event based on a response received from a remote server (e.g., exogenous event server device 114) after transmitting to the remote server a request for additional information associated with the exogenous event, such as a request for electronic information indicative of the industry or industries associated with the exogenous event "stock market is not performing well." In some embodiments, the EEI circuitry 212 may include hardware components designed or configured to transmit the identified one or more exogenous events to the NLA circuitry 214, NLR circuitry 222, or any other suitable device or circuitry.

The NLA circuitry 214 includes hardware components designed or configured to generate one or more natural language attribute data sets based on the identified first word, the identified first language, and the identified exogenous event. These hardware components may, for instance, utilize communications circuitry 208 to communicate with a user device (e.g., one or more of user devices 110A-110N), a user support device (e.g., one or more of user support devices 112A-112N), an exogenous event server device (e.g., one or more exogenous event server devices 114), a user data server device (e.g., one or more user data server devices 116), NLI circuitry 210, EEI circuitry 212, NLT circuitry 216, STT circuitry 218, TTS circuitry 220, NLR circuitry 222, or any other suitable circuitry or device. For example, the NLA circuitry 214 may be in communication with a NLI circuitry 210 and EEI circuitry 212, and thus configured to receive the identified first word and the identified first language from the NLI circuitry 210 and the identified one or more exogenous events from the EEI circuitry 212.

In some instances, the NLA circuitry 214 may be configured to receive an identified second word in the sequence of words from NLI circuitry 210 and generate one or more natural language attribute data sets also based on the identified second word. In some instances, the NLA circuitry 214 may be configured to receive an identified tone of the sequence of words identified by NLI circuitry 210 and generate one or more natural language attribute data sets also based on the identified tone. In some embodiments, each of the one or more natural language attribute data sets may comprise attribute data for a set of attributes associated with the first word. In some instances, the attribute data may comprise a plurality of attribute values (e.g., initial score value, weightage value, final score value) for each of the attributes associated with the first word. In some embodiments, the NLA circuitry 214 may include hardware components designed or configured to transmit the one or more natural language attribute data sets to the NLT circuitry 216 or any other suitable device or circuitry. It should also be appreciated that, in some embodiments, the NLA circuitry 214 may include a separate processor, specially configured field programmable gate array (FPGA), application specific interface circuit (ASIC), or cloud utility to perform the above functions.

In some embodiments, one or more of the processing circuitry 202, the NLI circuitry 210, the EEI circuitry 212, and the NLA circuitry 214 may include hardware components designed or configured to implement a neural network to facilitate nuance shaping. For example, the processing circuitry 202, NLI circuitry 210, the EEI circuitry 212, the NLA circuitry 214, or a combination thereof may comprise a two layer feedforward neural network to facilitate nuance shaping. The input layer of the neural network may comprise, for example, any combination of the one or more transliterated texts in the first language, the one or more exogenous events, and, in some instances, the tone. The output layer of the neural network may comprise, for example, the translated text in the second language. The hidden layers in the neural network may comprise, for example, various natural language attributes.

The NLT circuitry 216 includes hardware components designed or configured to generate a natural language transliteration data set based on the one or more natural language attribute data sets. These hardware components may, for instance, utilize communications circuitry 208 to communicate with a user device (e.g., one or more of user devices 110A-110N), a user support device (e.g., one or more of user support devices 112A-112N), an exogenous event server device (e.g., one or more exogenous event server devices 114), a user data server device (e.g., one or more user data server devices 116), NLI circuitry 210, EEI circuitry 212, NLA circuitry 214, STT circuitry 218, TTS circuitry 220, NLR circuitry 222, or any other suitable circuitry or device. For example, the NLT circuitry 216 may be in communication with the NLA circuitry 214, and thus configured to receive the one or more natural language attribute data sets from the NLA circuitry 214. In some embodiments, the natural language transliteration data set may comprise correlation data for each of the plurality of possible translations. In some instances, the correlation data may comprise one or more deviation data elements for each of the plurality of possible translations. In some instances, a deviation data element may comprise a deviation distance value and a deviation range value. It should also be appreciated that, in some embodiments, the NLT circuitry 216 may include a separate processor, specially configured field programmable gate array (FPGA), application specific interface circuit (ASIC), or cloud utility to perform the above functions.

In some embodiments, the NLT circuitry 216 may include hardware components designed or configured to generate, based on the natural language transliteration data set, a translation of the first word in the second natural language. For example, the NLT circuitry 216 may include hardware components designed or configured to generate, based on the natural language transliteration data set, the translation "gloomy" for the first word "kamzor" in the second natural language of English. In another example, the NLT circuitry 216 may include hardware components designed or configured to generate the translation based on a mean absolute deviation technique or a median absolute deviation technique. In some embodiments, the NLT circuitry 216 may include hardware components designed or configured to generate a translation "gloomy" in the second natural language of English for the first word "kamzor" based on the circumstances surrounding the conversation, such as one or more identified exogenous events associated with the sequence of words provided by the user, the identified tone of the sequence of words, other identified words in the sequence of words, any other suitable information, or any combination thereof. In some embodiments, the NLT circuitry 216 may include hardware components designed or configured to generate the translation by: generating a mean absolute deviation value for each of the plurality of possible translations; selecting one of the plurality of possible translations having a mean absolute deviation value less than all others of the plurality of possible translations; and generating the translation based on the selected possible translation. For example, the NLT circuitry 216 may include hardware components designed or configured to generate the translation "gloomy" by: generating a mean absolute deviation value for each of a plurality of possible translations in the natural language of English for the first word "kamzor" in the natural language of Hindi; selecting the possible translation "gloomy" having a mean absolute deviation value less than all others of the plurality of possible translations; and generating the translation based on the selected possible translation. In some embodiments, NLT circuitry 216 may include hardware components designed or configured to transmit the translation to a user device (e.g., one or more of user devices 110A-110N), a user support device (e.g., one or more of user support devices 112A-112N), TTS circuitry 220, or any other suitable device or circuitry for audio output of a vocal representation of the translation.

The STT circuitry 218 includes hardware components designed or configured to receive electronic information indicative of a sequence of words spoken by a user, generate electronic information indicative of a textual representation of the sequence of words spoken by the user based on the electronic information indicative of a sequence of words spoken by a user, and transmit the electronic information indicative of the textual representation of the sequence of words spoken by the user to the NLI circuitry 210. These hardware components may, for instance, utilize communications circuitry 208 to communicate with a user device (e.g., one or more of user devices 110A-110N), a user support device (e.g., one or more of user support devices 112A-112N), NLI circuitry 210, EEI circuitry 212, NLA circuitry 214, NLT circuitry 216, TTS circuitry 220, NLR circuitry 222, or any other suitable circuitry or device. For example, the STT circuitry 218 may be in communication with a user device (e.g., user device 110), and thus configured to receive, via communications circuitry 208, the electronic information indicative of a sequence of words spoken by the user to the user device. In another example, the STT circuitry 218 may be in communication with the NLI circuitry 210, and thus configured to transmit the electronic information indicative of the textual representation of the sequence of words spoken by the user to the NLI circuitry 210, via communications circuitry 208. The STT circuitry 218 may utilize processing circuitry 202 to perform the above operations, and may utilize memory 204 to store collected electronic information indicative of sequences of words spoken by users, electronic information indicative of textual representations of those sequences of words, or other electronic information. It should also be appreciated that, in some embodiments, the STT circuitry 218 may include a separate processor, specially configured field programmable gate array (FPGA), application specific interface circuit (ASIC), or cloud utility to perform the above functions.

The TTS circuitry 220 includes hardware components designed or configured to receive a translation or response signal, generate electronic information indicative of a vocal representation of the translation or response signal, and transmit the electronic information indicative of the vocal representation of the translation or response signal to the input-output circuitry 206. These hardware components may, for instance, utilize communications circuitry 208 to communicate with a user device (e.g., one or more of user devices 110A-110N), a user support device (e.g., one or more of user support devices 112A-112N), NLI circuitry 210, EEI circuitry 212, NLA circuitry 214, NLT circuitry 216, STT circuitry 218, NLR circuitry 222, or any other suitable circuitry or device. For example, the TTS circuitry 220 may be in communication with a user support device (e.g., user support device 112), and thus configured to transmit the electronic information indicative of the vocal representation of a translation to the user support device, via communications circuitry 208. In another example, the TTS circuitry 220 may be in communication with a user device (e.g., user device 110), and thus configured to transmit the electronic information indicative of the vocal representation of a response signal (e.g., a response signal generated by NLR circuitry 222 based on a template) to the user device, via communications circuitry 208. The TTS circuitry 220 may utilize processing circuitry 202 to perform the above operations, and may utilize memory 204 to store collected translations, response signals, electronic information indicative of the vocal representations of the translations and response signals, or other electronic information. It should also be appreciated that, in some embodiments, the TTS circuitry 220 may include a separate processor, specially configured field programmable gate array (FPGA), application specific interface circuit (ASIC), or cloud utility to perform the above functions. In some embodiments, the STT circuitry 218 may partially or wholly comprise the TTS circuitry 220.

The NLR circuitry 222 includes hardware components designed or configured to determine whether the sequence of words matches a template based on the first electronic information and the identified tone. These hardware components may, for instance, utilize communications circuitry 208 to communicate with a user device (e.g., one or more of user devices 110A-110N), a user support device (e.g., one or more of user support devices 112A-112N), an exogenous event server device (e.g., one or more exogenous event server devices 114), a user data server device (e.g., one or more user data server devices 116), NLI circuitry 210, EEI circuitry 212, NLA circuitry 214, NLT circuitry 216, STT circuitry 218, or any other suitable circuitry or device. For example, the NLR circuitry 222 may be in communication with the NLI circuitry 210, and thus configured to receive the first electronic information and the identified tone. In another example, the NLR circuitry 222 may be in communication with the EEI circuitry 212, and thus configured to receive the second electronic information and the identified one or more exogenous events. In another example, the NLR circuitry 222 may be in communication with the NLA circuitry 214, and thus configured to receive the one or more natural language attribute data sets. In another example, the NLR circuitry 222 may be in communication with the NLT circuitry 216, and thus configured to receive the natural language attribute data set and the translation. It should also be appreciated that, in some embodiments, the NLR circuitry 222 may include a separate processor, specially configured field programmable gate array (FPGA), application specific interface circuit (ASIC), or cloud utility to perform the above functions.

In some embodiments, the NLR circuitry 222 may include hardware components designed or configured to determine that the sequence of words matches a template and generate, based on the template, a first response signal. For example, the NLR circuitry 222 may include hardware components designed or configured to generate a first response signal comprising the sequence of words "Everything will be okay, let me transfer you to a representative" based on the sequence of words "my mortgage is stressing me out" in the natural language of English and the tone "worried." In some embodiments, the NLR circuitry 222 may include hardware components designed or configured to determine that the sequence of words does not match a template and generate a second response signal requesting additional information, such as one or more additional words to be provided by the user. For example, the NLR circuitry 222 may include hardware components designed or configured to generate a second response signal comprising the sequence of words "I am having difficulty understanding you, did you say that your mortgage is stressing you out?" based on the sequence of words "my mortgage is freaking me out" in the natural language of English and the tone "scared." In some embodiments, the NLR circuitry 222 may include hardware components designed or configured to transmit the first response signal, the second response signal, or both to a user device (e.g., one or more of user devices 110A-110N), a user support device (e.g., one or more of user support devices 112A-112N), TTS circuitry 220, or any other suitable device or circuitry for audio output of a vocal representation of the first response signal, the second response signal, or both.

In some embodiments, the NLR circuitry 222 may include hardware components designed or configured to update the template. For example, when the NLR circuitry 222 determines that a second sequence of words (e.g., a second sequence of words provided by the user in response to a second response signal previously generated and transmitted by the NLR circuitry 222) matches a template, the NLR circuitry 222 may include hardware components designed or configured to update the template by associating the first sequence of words (e.g., the first sequence of words that the NLR circuitry 222 previously determined did not match the template) with the template such that the first sequence of words subsequently will match the template. In one illustrative example, the NLR circuitry 222 may include hardware components designed or configured to update the template such that NLR circuitry 222 is configured to generate, at a subsequently time, a first response signal comprising the sequence of words "Everything will be okay, let me transfer you to a representative" based on the sequence of words "my mortgage is freaking me out" in the natural language of English and the tone "scared."

In some embodiments, the NLR circuitry 222 may include hardware components designed or configured to use a template for a particular word to translate that word into a second language while retaining the particular nuances and meaning associated with that the user's use of that word in the first language. In some instances, the template may be a shorthand for identifying a correct nuanced translation of a word. For example, the template may define a set of characteristics for a word in a first language that, when they appear in association with the word, can be used as a shorthand to indicate that a first word is properly translated as a particular second word in a second language. In one illustrative example, if the word "kamzor" is used with a particular tone of voice and particular type of exogenous event, the analysis described with reference to NLA circuitry 214 and NLT circuitry 216 need not be performed, and instead the NLR circuitry 222 knows that the properly nuanced translation for "kamzor" is "gloomy." Subsequently, the NLR circuitry 222 may identify some new characteristic for the word "kamzor" also supporting the translation "gloomy" (e.g., a certain sequence of words involving "kamzor") and incorporate that new characteristic into the template going forward.

In some embodiments, one or more of the NLI circuitry 210, EEI circuitry 212, NLA circuitry 214, NLT circuitry 216, STT circuitry 218, TTS circuitry 220, and NLR circuitry 222 may be hosted locally by the apparatus 200. In some embodiments, one or more of the NLI circuitry 210, EEI circuitry 212, NLA circuitry 214, NLT circuitry 216, STT circuitry 218, TTS circuitry 220, and NLR circuitry 222 may be hosted remotely (e.g., by one or more cloud servers) and thus need not physically reside on the apparatus 200. Thus, some or all of the functionality described herein may be provided by a third party. For example, when remotely provisioning an apparatus 200, the apparatus 200 may access one or more of third party circuitries via a digitizer and a telephone module, a Wi-Fi module, a software phone module, or any sort of networked connection that facilitates transmission of digitized voice commands to the STT circuitry 218. In turn, the STT circuitry 218 may be in remote communication with one or more of the NLI circuitry 210, EEI circuitry 212, NLA circuitry 214, NLT circuitry 216, TTS circuitry 220, and NLR circuitry 222. In some embodiments, the NLI circuitry 210 may be deployed as a first cloud utility, the EEI circuitry 212 may be deployed as a second cloud utility, the STT circuitry 218 may be deployed as a third cloud utility, and the TTS circuitry 220 may be deployed as a fourth cloud utility.

As will be appreciated, any such computer program instructions and/or other type of code may be loaded onto a computer, processor or other programmable apparatus's circuitry to produce a machine, such that the computer, processor other programmable circuitry that execute the code on the machine create the means for implementing various functions, including those described herein.

As described above and as will be appreciated based on this disclosure, embodiments of the present disclosure may be configured as systems, apparatuses, methods, mobile devices, backend network devices, computer program products, other suitable devices, and combinations thereof. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

The user devices 110A-110N, user support devices 112A-112N, one or more exogenous event server devices 114, and one or more user data server devices 116 may be embodied by one or more computing devices or systems that also may include processing circuitry, memory, input-output circuitry, and communications circuitry. For example, a user device 110 may be a smartphone on which an app (e.g., a mobile banking app) is running or otherwise being executed by processing circuitry. As it relates to operations described in the present disclosure, the functioning of these components may be similar to the similarly named components described above with respect to FIG. 2. Additional description of the mechanics of these components is omitted for the sake of brevity. These device elements, operating together, provide the respective apparatuses with the functionality necessary to facilitate the communication of data (e.g., electronic marketing information, business analytic data, or the like) with the NLP system described herein.

Figure 3A:
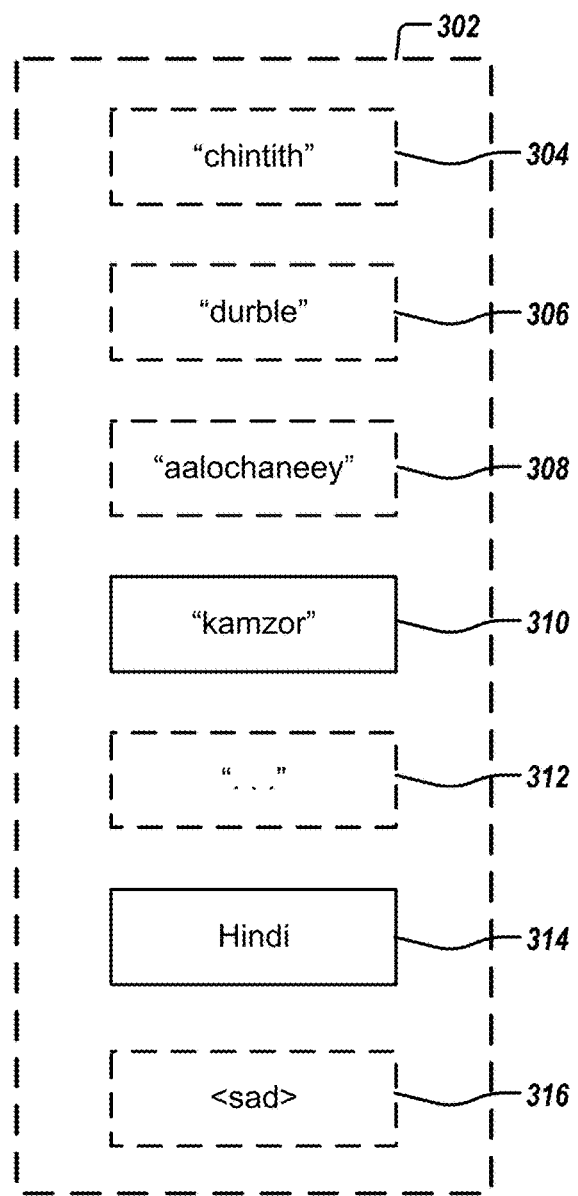
FIGS. 3A to 3B illustrate example electronic information indicative of sequences of words in accordance with some example embodiments described herein.
Figure 3B:
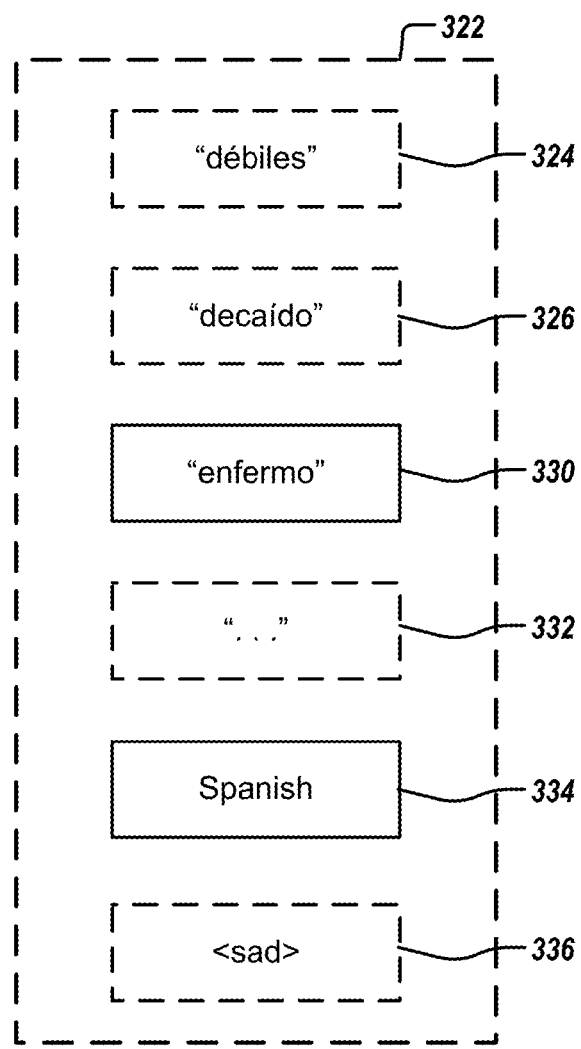

FIGS. 3A to 3B illustrate example electronic information indicative of sequences of words provided by users in accordance with some example embodiments described herein.

FIG. 3A illustrates example electronic information 300 indicative of a sequence of words 302 provided by a user in accordance with some example embodiments described herein. As shown in FIG. 3A, the sequence of words 302 may comprise a set of one or more words provided (e.g., spoken, typed) by a user in one or more natural languages. For example, the sequence of words 302 may comprise word 304 ("chintith"), word 306 ("durble"), word 308 ("aalochaneey"), word 310 ("kamzor"), and one or more other words 312 in natural language 314 (Hindi). In other embodiments, the sequence of words 302 may comprise one or more words in the natural language of English, Hindi, Spanish, Chinese, Russian, any other natural language, or any combination thereof. For example, the sequence of words 302 may comprise word 310 ("kamzor") in natural language 314 (Hindi) and word 312 ("enfermo") in the natural language of Spanish. In some embodiments, the NLP system 102 shown in FIG. 1, the apparatus 200 shown in FIG. 2, or both may process the sequence of words 302 to identify a first word 310 ("kamzor") in a first natural language 314 (Hindi). In some embodiments, the NLP system 102 shown in FIG. 1, the apparatus 200 shown in FIG. 2, or both may process the sequence of words 302 to identify a second word 306 ("durble") in the first natural language 314 (Hindi).

In some embodiments, the sequence of words 302 provided by the user may be a set of hypernyms. For example, the user may provide (e.g., speak, type) the word 310 ("kamzor") during one part of a conversation. The user may also provide the word 304 ("chintith"), the word 306 ("durble"), the word 308 ("aalochaneey"), and one or more other words 312 during other parts of the same conversation. In this example, the sequence of words 302 may be a set of words (e.g., words 304, 306, 308, and 310) falling within the hypernym "sad" or "weak." In some instances, the NLP system 102 shown in FIG. 1, apparatus 200 shown in FIG. 2, or both may generate the sequence of words 302 by identifying the set of hypernyms. For example, the NLI circuitry 210 described with reference to FIG. 2 may generate the sequence of words 302 by identifying, in a conversation spoken by a user, the set of words 304, 306, 308, and 310 falling within the hypernym "sad" or "weak." In another example, the NLI circuitry 210 described with reference to FIG. 2 may generate the sequence of words 302 by identifying, in a first part of a conversation spoken by a user, the word 310. The NLI circuitry 210 may identify that the word 310 falls within the hypernym "sad" or "weak." The NLI circuitry 210 may then search for and identify other words that also fall within the hypernym "sad" or "weak," such as words 304, 306, and 308.

In some embodiments, the NLP system 102 shown in FIG. 1, the apparatus 200 shown in FIG. 2, or both may process the electronic information 300 to identify a tone 316 of the sequence of words 302 provided by the user. For example, the NLP system 102 shown in FIG. 1, the apparatus 200 shown in FIG. 2 (e.g., using NLI circuitry 210), or both may process the electronic information 300 to identify the tone 316 (<sad>) based on a sequence of words 302 having a relatively low pitch, a relatively slow pace or speed, a relative emphasis or stress on a particular word such as word 310 ("kamzor") relative pauses between words, any other suitable information, or any combination thereof. In some embodiments, all or a portion of the electronic information 300 may be stored in the NLP system 102 (e.g., one or more server devices 104, one or more databases 106) shown in FIG. 1; the apparatus 200 (e.g., memory 204, NLI circuitry 210) shown in FIG. 2; or a combination thereof.

FIG. 3B illustrates example electronic information 320 indicative of a sequence of words 322 provided by a user in accordance with some example embodiments described herein. As shown in FIG. 3B, the sequence of words 322 may comprise a set of one or more words provided (e.g., spoken, typed) by a user in one or more natural languages. For example, the sequence of words 322 may comprise word 324 ("débiles"), word 326 ("decaído"), word 330 ("enfermo"), and one or more other words 332 in natural language 334 (Spanish). In other embodiments, the sequence of words 322 may comprise one or more words in the natural language of English, Hindi, Spanish, Chinese, Russian, any other natural language, or any combination thereof. For example, the sequence of words 322 may comprise word 330 ("enfermo") in natural language 334 (Spanish) and word 332 ("kamzor") in the natural language of Hindi. In some embodiments, the NLP system 102 shown in FIG. 1, the apparatus 200 shown in FIG. 2, or both may process the sequence of words 322 to identify a first word 330 ("enfermo") in a first natural language 334 (Spanish). In some embodiments, the NLP system 102 shown in FIG. 1, the apparatus 200 shown in FIG. 2, or both may process the sequence of words 322 to identify a second word 326 ("decaído") in the first natural language 334 (Spanish).

In some embodiments, the sequence of words 322 provided by the user may be a set of hypernyms. For example, the user may provide (e.g., speak, type) the word 330 ("enfermo") during one part of a conversation. The user may also provide the word 324 ("débiles"), the word 326 ("decaído"), and one or more other words 332 during other parts of the same conversation. In this example, the sequence of words 322 may be a set of words (e.g., words 324, 326, and 330) falling within the hypernym "sad" or "weak." In some instances, the NLP system 102 shown in FIG. 1, apparatus 200 shown in FIG. 2, or both may generate the sequence of words 322 by identifying the set of hypernyms. For example, the NLI circuitry 210 described with reference to FIG. 2 may generate the sequence of words 322 by identifying, in a conversation spoken by a user, the set of words 324, 326, and 330 falling within the hypernym "sad" or "weak." In another example, the NLI circuitry 210 described with reference to FIG. 2 may generate the sequence of words 322 by identifying, in a first part of a conversation spoken by a user, the word 330. The NLI circuitry 210 may identify that the word 330 falls within the hypernym "sad" or "weak." The NLI circuitry 210 may then search for and identify other words that also fall within the hypernym "sad" or "weak," such as words 324 and 326.

In some embodiments, the NLP system 102 shown in FIG. 1, the apparatus 200 shown in FIG. 2, or both may process the electronic information 320 to identify a tone 336 of the sequence of words 322 provided by the user. For example, the NLP system 102 shown in FIG. 1, the apparatus 200 shown in FIG. 2 (e.g., using NLI circuitry 210), or both may process the electronic information 320 to identify the tone 336 (<sad>) based on a sequence of words 322 having a relatively low pitch, a relatively slow pace or speed, a relative emphasis or stress on a particular word such as word 330 ("enfermo") relative pauses between words, any other suitable information, or any combination thereof. In some embodiments, all or a portion of the electronic information 320 may be stored in the NLP system 102 (e.g., one or more server devices 104, one or more databases 106) shown in FIG. 1; the apparatus 200 (e.g., memory 204, NLI circuitry 210) shown in FIG. 2; or a combination thereof.

Figure 4:
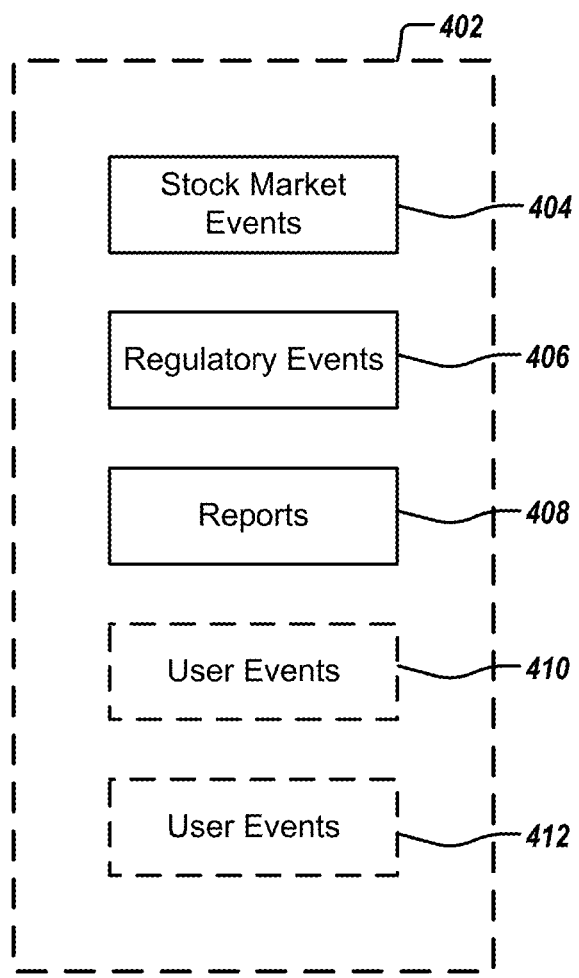
FIG. 4 illustrates example electronic information indicative of exogenous events in accordance with some example embodiments described herein.

FIG. 4 illustrates example electronic information 400 indicative of one or more exogenous events 402 in accordance with some example embodiments described herein. As shown in FIG. 4, the one or more exogenous events 402 may comprise a set of one or more exogenous events corresponding to one or more global events, regional events, user events, any other suitable exogenous events, or any combination thereof. For example, the one or more exogenous events 402 may comprise one or more stock market events 404, one or more regulatory events 406, one or more reports 408, one or more other user events 410, one or more other exogenous events 412, or combinations thereof. The one or more stock market events 404 may correspond to one or more stock market-related exogenous events, such as "stock market is not performing well," "U.S. stock market is not performing well," "NASDAQ is not performing well," "stock market is performing well," any other suitable exogenous events, or any combination thereof. The one or more regulatory events 406 may correspond to one or more regulatory-related exogenous events, such as "interest rate hike," any other suitable exogenous events, or any combination thereof. The one or more reports 408 may correspond to one or more report-related exogenous events, such as "steady U.S. job growth," "low U.S. unemployment," other exogenous events related to the U.S. Jobs Report, any other suitable exogenous events, or any combination thereof. The one or more other user events 410 may correspond to one or more exogenous events associated with a user (e.g., the user who provided the sequence of words 302 shown in FIG. 3A), such as one or more exogenous events associated with the user's geolocation, the user's accounts, any other suitable exogenous events, or combinations thereof. For example, for a user located or domiciled in, or a citizen of, the United States, the one or more other user events 410 may correspond to user-related exogenous events such as "U.S. stock market is not performing well," "outbreak of Zika near the user's home address," "yesterday was the Super Bowl," "looming cash flow crisis," "credit card debt," "recent bonus," any other exogenous event, or any combination thereof. In some embodiments, all or a portion of the electronic information 400 may be stored in the NLP system 102 (e.g., one or more server devices 104, one or more databases 106), the one or more exogenous event server devices 114, or the one or more user data server devices 116 shown in FIG. 1; the apparatus 200 shown in FIG. 2 (e.g., memory 204, EEI circuitry 212); or a combination thereof.

FIGS. 5A to 5E illustrate example natural language attribute (NLA) data sets in accordance with some example embodiments described herein.

Figure 5A:
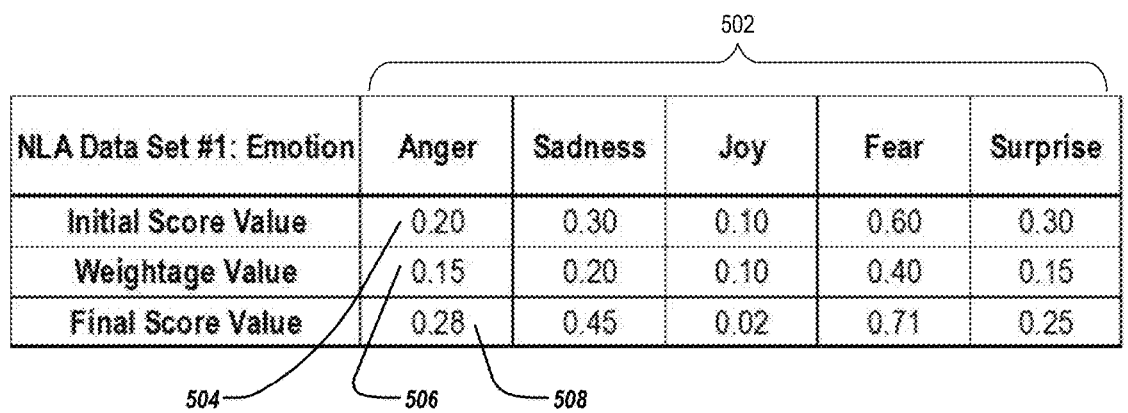

FIG. 5A illustrates an example NLA data set 500 in accordance with some example embodiments described herein. As shown in FIG. 5A, the example NLA data set 500 may correspond to the emotion of the identified first word (e.g., word 310 ("kamzor") shown in FIG. 3A). The example NLA data set 500 may comprise attribute data 502 for a set of one or more emotion attributes (e.g., anger, sadness, joy, fear, surprise) associated with the sequence of words, the identified first word, the user who provided the sequence of words, or a combination thereof. In some instances, the attribute data 502 may comprise a plurality of attribute values for each of the emotion attributes. For example, the attribute data 502 may comprise attribute value 504 (Initial Score Value=0.60), attribute value 506 (Weightage Value=0.40), and attribute value 508 (Final Score Value=0.71) for the emotion attribute "Fear." In some embodiments, the NLP system's calculation of the attribute values in attribute data 502 may be updated as the conversation progresses, based on a tone of the conversation, or based on one or more exogenous events. For example, if a user first talks about the stocks falling and then theft in their neighborhood, then the weighting of "kamzor" towards fear may increase. In another example, if a user first talks about the stocks failing and then booming home prices, then the weighting of "kamzor" may be changed towards a sense of surprise yet helplessness. In some instances, the NLP system's calculation of the attribute values in attribute data 502 may be affected by the nature of the received set of exogenous events. For example, if the stock market has fallen, the NLP system may introduce a bias towards fear (e.g., by increasing attribute value 506) when identifying the emotion of the user's speech. In some embodiments, the NLP system 102, the apparatus 200, or both may be configured to generate on NLA data set 500, or any other NLA data set described herein, by receiving user input (e.g., from a language expert) to setup the seed initial score. For example, "kamzor" mostly indicates fear and thus 'fear' has the highest score as shown in FIG. 5A.

FIG. 5B illustrates an example NLA data set 520 in accordance with some example embodiments described herein. As shown in FIG. 5B, the example NLA data set 520 may correspond to the topic of the identified first word (e.g., word 310 ("kamzor") shown in FIG. 3A). The example NLA data set 520 may comprise attribute data 522 for a set of one or more topic attributes (e.g., finance, social, personal, political) associated with the sequence of words, the identified first word, the user who provided the sequence of words, or a combination thereof. In some instances, the attribute data 522 may comprise a plurality of attribute values for each of the topic attributes. For example, the attribute data 522 may comprise attribute value 524 (Initial Score Value=0.20), attribute value 526 (Weightage Value=0.40), and attribute value 528 (Final Score Value=0.80) for the topic attribute "Finance." In some embodiments, the NLP system's calculation of the attribute values in attribute data 522 may be updated as the conversation progresses, based on a tone of the conversation, or based on one or more exogenous events. In some instances, the NLP system's calculation of the attribute values in attribute data 522 may be affected by the nature of the received set of exogenous events. For example, if the stock market has fallen, the NLP system may introduce a bias towards finance (e.g., by increasing attribute value 526) when identifying the topic of the user's speech.

FIG. 5C illustrates an example NLA data set 540 in accordance with some example embodiments described herein. As shown in FIG. 5C, the example NLA data set 540 may correspond to the sentiment of the identified first word (e.g., word 310 ("kamzor") shown in FIG. 3A). The example NLA data set 540 may comprise attribute data 542 for a set of one or more sentiment attributes (e.g., polarity, perspective, statement, and, in some instances, purpose (not shown)) associated with the sequence of words, the identified first word, the user who provided the sequence of words, or a combination thereof. In some instances, the attribute data 542 may comprise a plurality of attribute values for each of the sentiment attributes. For example, the attribute data 542 may comprise attribute value 544 (Sentiment=Subjective), attribute value 546 (Initial Score Value=0.21), attribute value 548 (Weightage Value=0.40), and attribute value 550 (Final Score Value=0.85) for the sentiment attribute "Polarity." In some embodiments, the NLP system's calculation of the attribute values in attribute data 542 may be updated as the conversation progresses, based on a tone of the conversation, or based on one or more exogenous events. In some instances, the NLP system's calculation of the attribute values in attribute data 542 may be affected by the nature of the received set of exogenous events. For example, if the stock market has fallen, the NLP system may introduce a bias towards negativity (e.g., by increasing the attribute value associated with the Weightage Value for the sentiment attribute "Negativity") when identifying the sentiment of the user's speech.

FIG. 5D illustrates an example NLA data set 560 in accordance with some example embodiments described herein. As shown in FIG. 5D, the example NLA data set 540 may correspond to the framing effect of the identified first word (e.g., word 310 shown in FIG. 3A). The example NLA data set 560 may comprise attribute data 562 for a set of one or more framing effect attributes (e.g., positive, negative, neutral) associated with the sequence of words, the identified first word, the user who provided the sequence of words, or a combination thereof. In some instances, the attribute data 562 may comprise a plurality of attribute values for each of the framing effect attributes. For example, the attribute data 562 may comprise attribute value 564 (Initial Score Value=0.20), attribute value 566 (Weightage Value=0.30), and attribute value 568 (Final Score Value=0.12) for the framing effect attribute "Positive." In some embodiments, the NLP system's calculation of the attribute values in attribute data 562 may be updated as the conversation progresses, based on a tone of the conversation, or based on one or more exogenous events. In some instances, the NLP system's calculation of the attribute values in attribute data 562 may be affected by the nature of the received set of exogenous events. For example, if the stock market has fallen, the NLP system may introduce a bias (e.g., by increasing the attribute value associated with the Weightage Value for the framing effect attribute "Negative") when identifying the framing effect of the user's speech.

FIG. 5E illustrates an example NLA data set 580 in accordance with some example embodiments described herein. As shown in FIG. 5E, the example NLA data set 580 may correspond to the viability of the identified first word (e.g., word 310 shown in FIG. 3A). The example NLA data set 580 may comprise attribute data 582 for a set of one or more viability attributes (e.g., financial stability, environmental sustainability, societal values) associated with the sequence of words, the identified first word, the user who provided the sequence of words, or a combination thereof. In some instances, the attribute data 582 may comprise a plurality of attribute values for each of the viability attributes. For example, the attribute data 582 may comprise attribute value 584 (Initial Score Value=0.15), attribute value 586 (Weightage Value=0.50), and attribute value 588 (Final Score Value=0.36) for the viability attribute "Financial Stability." In some embodiments, the NLP system's calculation of the attribute values in attribute data 582 may be updated as the conversation progresses, based on a tone of the conversation, or based on one or more exogenous events. In some instances, the NLP system's calculation of the attribute values in attribute data 582 may be affected by the nature of the received set of exogenous events. For example, if the stock market has fallen, the NLP system may introduce a bias (e.g., by increasing the attribute value associated with the Weightage Value for the viability attribute "Financial Stability") when identifying the viability of the user's speech.

In some embodiments, the NLP system 102, the apparatus 200, or both may be configured to generate NLA data set 500, NLA data set 520, NLA data set 540, NLA data set 560, NLA data set 580, or any combination thereof by receiving a passage of words and performing analysis on that passage to generate a classification. For example, any of the embodiments described herein may involve reinforced learning wherein a language expert might say whether generated classification is suitable, unsuitable, or needs adjustment. In some embodiments, an NLA value may be generated for each of NLA data set 500, NLA data set 520, NLA data set 540, NLA data set 560, and NLA data set 580 that aggregates the final scoring value and weightage value for that data set using, for example, a weighted mean, a geometric mean (which may be useful for properties with varying ranges), a harmonic mean (a conservative technique which may be useful for properties that are based on, for example, stock index or living quality index), and a truncated mean (which removes outliers).

For example, an NLA value may be generated for NLA data set 500 shown in FIG. 5A based on the equation: anger final score value (0.28) times anger weightage value (0.15) plus sadness final score value (0.45) times sadness weightage value (0.20) plus joy final score value (0.02) times joy weightage value (0.10) plus fear final score value (0.71) times fear weightage value (0.40) plus surprise final score value (0.25) times surprise weightage value (0.15) equals the NLA data value (0.46) for NLA data set 500 (i.e., (0.28*0.15)+(0.45*0.20)+(0.02*0.10)+(0.71*0.40)+ (0.25*0.15)=0.4555, which rounded to the nearest hundredth is 0.46).

In another example, an NLA value may be generated for NLA data set 520 shown in FIG. 5B based on the equation: finance final score value (0.80) times finance weightage value (0.40) plus social final score value (0.10) times social weightage value (0.30) plus personal final score value (0.30) times personal weightage value (0.20) plus political final score value (0.40) times political weightage value (0.10) equals the NLA data value (0.45) for NLA data set 520 (i.e., (0.80*0.40)+(0.10*0.30)+(0.30*0.20)+(0.40*0.10)=0.45).

In yet another example, an NLA value may be generated for NLA data set 540 shown in FIG. 5C based on the equation: polarity final score value (0.85) times polarity weightage value (0.40) plus perspective final score value (0.82) times perspective weightage value (0.40) plus statement final score value (0.79) times statement weightage value (0.20) equals the NLA data value (0.87) for NLA data set 540 (i.e., (0.85*0.40)+(0.82*0.40)+(0.79*0.20)=0.826, which rounded to the nearest hundredth is 0.87).

Figure 6C:
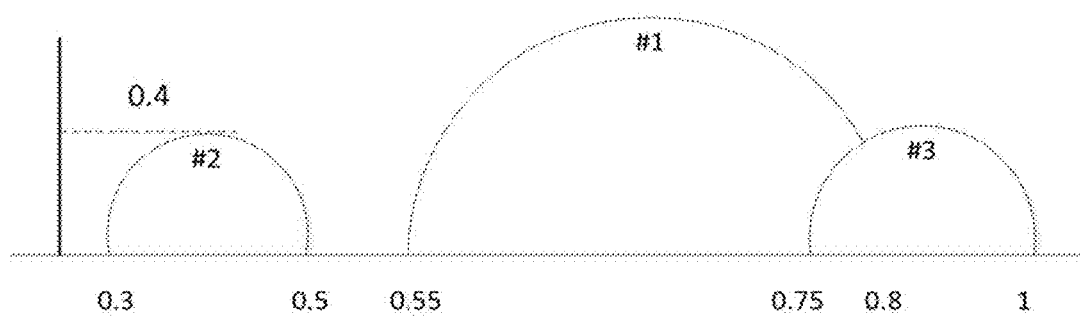

FIGS. 6A to 6C illustrate example natural language transliteration data sets in accordance with some example embodiments described herein.

FIG. 6A illustrates an example NLT data set 600 in accordance with some example embodiments described herein. As shown in FIG. 6A, the example NLT data set 600 may comprise correlation data for each of the plurality of possible translations in the natural language of English for the identified first word "kamzor" (e.g., word 310 shown in FIG. 3A). In some embodiments, the correlation data may comprise correlation data 602 (based on NLA data set 500 shown in FIG. 5A), correlation data 604 (based on NLA data set 520 shown in FIG. 5B), and correlation data 606 (based on NLA data set 540 shown in FIG. 5C) for a plurality of possible translations 608 (e.g., "weak," "vulnerable," "sick," "gloomy," and other words).

In some instances, the plurality of possible translations 608 may comprise a set of adjectives that current incoming adjective can be translated into. For example, "kamzor" can be translated into "weak," "vulnerable," "sick," "gloomy," and other words based on a previously identified hypernym set, such as the set of hypernyms described with reference to FIG. 3A. The NLT data set 600 may comprise a row for each adjective with correlation data for each previously generated NLA data set.

In some instances, the correlation data may comprise one or more deviation data elements for each of the plurality of possible translations. In some instances, a deviation data element may comprise a deviation distance value and a deviation range value. The deviation range value may provide the diameter on the number line (e.g., as shown in FIG. 6C), and the deviation distance value may be the scalar quantity for that deviation range value. The deviation range value may also correspond to a spread. For example, correlation data 602 may comprise a deviation data element for the possible translation "gloomy" comprising the deviation distance value 610 (Distance=0.7) and the deviation range value 612 (Range=0.30 to 0.50). In another example, correlation data 604 may comprise a deviation data element for the possible translation "gloomy" comprising the deviation distance value 614 (Distance=0.40) and the deviation range value 616 (Range=0.55 to 0.80). In another example, correlation data 606 may comprise a deviation data element for the possible translation "gloomy" comprising the deviation distance value 618 (Distance=0.40) and the deviation range value 620 (Range=0.75 to 1.00).

FIG. 6B illustrates an example natural language transliteration data set 640 in accordance with some example embodiments described herein. In the NLT system is further configured to generate the translation based on a mean absolute deviation technique or a median absolute deviation technique. For example, the NLT system may generate the English translation "gloomy" for the identified first word "kamzor" in the Hindi conversation. As shown in FIG. 6B, the example NLT data set 600 illustrates a selected possible translation "gloomy" having a mean absolute deviation value less than all others of the plurality of possible translations; and generating the translation based on the selected possible translation. In some embodiments, the NLP system may aggregate the correlation data for each of the possible translations from each of the NLA data sets (e.g., NLA data sets 500, 520, 540, 560, and 580 shown in FIGS. 5A-5E) and use the aggregation in connection with NLT data set 600 to identify, from a set of possibly corresponding English language words (e.g., the plurality of possible translations 608 shown in FIG. 6A), the most appropriate English language word corresponding to the word provided by the user (e.g., word 310 ("kamzor") shown in FIG. 3A).

In some embodiments, the NLT system may perform the identification step described above using a mean absolute deviation (MAD) technique. For example, the deviation distance value may be used to calculate how far the NLA data value is from each of the plurality of possible translations 608 (e.g., "weak," "vulnerable," "sick," "gloomy") for a given row. For example, correlation data 602 provides that "gloomy" and "vulnerable" are a similar distance (0.70 and 0.60, respectively) from the NLA data value (0.46) for NLA data set 500. In another example, correlation data 604 provides that "gloomy" and "weak" are a similar distance (0.40 and 0.30, respectively) from the NLA data value (0.45) for NLA data set 520. In yet another example, correlation data 606 provides that "gloomy" is a similar distance (0.40) from the NLA data value (0.87) for NLA data set 540. Subsequently, MAD is calculated for each row (i.e., each of the plurality of possible translations 608 (e.g., "weak," "vulnerable," "sick," "gloomy")), vis-á-vis "kamzor." The row for which the least MAD is calculated (i.e., the closest proximity of the native word to the non-native word) is then identified as the properly nuanced translation. For example, as shown in FIG. 6B, the least MAD is calculated for "gloomy" and thus the English word "gloomy" is identified as the properly nuanced translation for the Hindi word "kamzor." By using the particular combinations of speech analysis described herein and improving them by also taking into account the existence of exogenous events that are likely to affect a customer's intonation and speech patterns, the NLT system is able to more actually translate non-English words that have multiple plausible translations into properly nuanced English text.

FIG. 6C illustrates a curve 660 for the correlation data 602 comprising the deviation data element for the possible translation "gloomy" comprising the deviation distance value 610 (Distance=0.7) and the deviation range value 612 (Range=0.30 to 0.50), the correlation data 604 comprising the deviation data element for the possible translation "gloomy" comprising the deviation distance value 614 (Distance=0.40) and the deviation range value 616 (Range=0.55 to 0.80), and correlation data 606 comprising the deviation data element for the possible translation "gloomy" comprising the deviation distance value 618 (Distance=0.40) and the deviation range value 620 (Range=0.75 to 1.00).

Having described specific components of example devices involved in the present disclosure, example procedures for processing natural language are described below in connection with FIGS. 7-12.

Example Operations for Processing Natural Language

Figure 7:
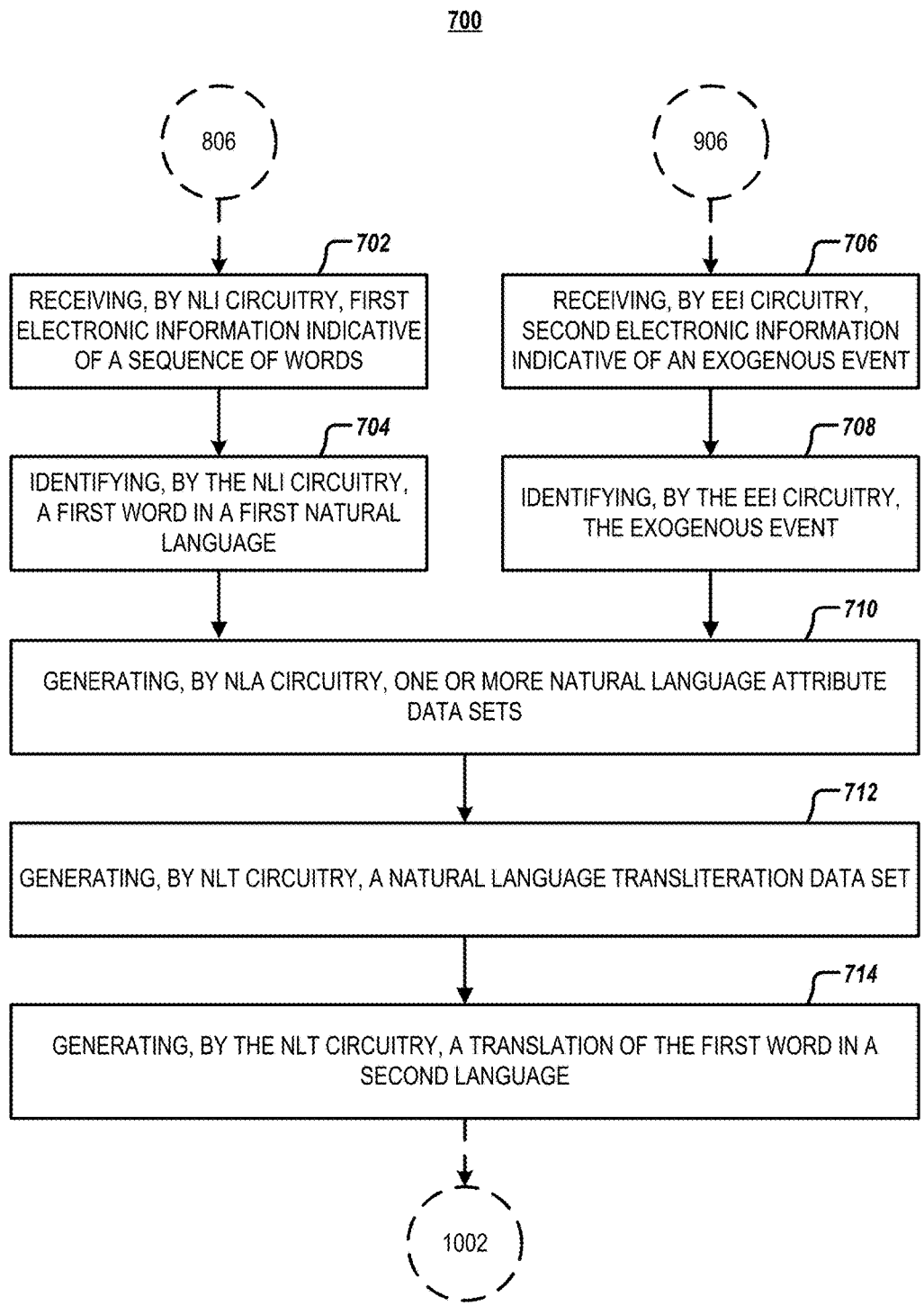
FIG. 7 illustrates an example flowchart for processing electronic information indicative of natural language in accordance with some example embodiments described herein.

Turning to FIG. 7, an example flowchart 700 is illustrated that contains example operations for processing electronic information indicative of natural language according to an example embodiment. The operations illustrated in FIG. 7 may, for example, be performed by one or more components described with reference to NLP system 102 shown in FIG. 1, by a user device 110 or a user support device 112 in communication with NLP system 102, by apparatus 200 shown in FIG. 2, or by any combination thereof. In some embodiments, the various operations described in connection with FIG. 7 may be performed by the apparatus 200 by or through the use of one or more of processing circuitry 202, memory 204, input-output circuitry 206, communications circuitry 208, NLI circuitry 210, EEI circuitry 212, NLA circuitry 214, NLT circuitry 216, STT circuitry 218, TTS circuitry 220, NLR circuitry 222, any other suitable circuitry, and any combination thereof.

As shown by operation 702, the apparatus 200 includes means, such as NLI circuitry or the like, for receiving first electronic information indicative of a sequence of words provided by a user. The NLI circuitry may be any suitable NLI circuitry described herein, such as NLI circuitry 210 described with reference to FIG. 2. The sequence of words may be any suitable sequence of words, such as the sequence of words described with reference to electronic information 300 shown in FIG. 3A. For example, the sequence of words may comprise the words "chintith," "durble," "aalochaneey," and "kamzor." In some embodiments, the sequence of words may comprise a first word, such as word 310 shown in FIG. 3A, in a first natural language, such as natural language 314 shown in FIG. 3A. For example, the sequence of words may comprise the word "kamzor" in the first natural language of Hindi. In some embodiments, the first word may correspond to a plurality of possible translations in a second natural language, such as possible translations 608 shown in FIG. 6A. For example, the first word "kamzor" in the first natural language of Hindi may correspond to the possible translations "weak," "vulnerable," "sick," and "gloomy" in the second natural language of English. In some embodiments, the apparatus 200 may include means, such as communications circuitry in communication with the NLI circuitry or the like, for receiving the first electronic information. The communications circuitry may be any suitable communications circuitry described herein, such as communications circuitry 208 described with reference to FIG. 2. In some embodiments, the apparatus 200 may receive the first electronic information from a user device (e.g., user device 110) or a user support device (e.g., user support device 112), as described in more detail with reference to FIGS. 1 and 2. For example, the user device or the user support device may transmit the first electronic information to the NLI circuitry of apparatus 200. In other embodiments, the apparatus 200 may receive the first electronic information from STT circuitry, as described in more detail with reference to FIG. 8. For example, the STT circuitry may transmit the first electronic information to the NLI circuitry of apparatus 200.

As shown by operation 704, the apparatus 200 includes means, such as the NLI circuitry or the like, for identifying the first word and the first natural language based on the first electronic information. For example, the apparatus 200 may comprise NLI circuitry 210 for identifying the first word "kamzor" and the first natural language of Hindi based on a sequence of words that comprises the words "chintith," "durble," "aalochaneey," and "kamzor." In some instances, the apparatus 200 may comprise NLI circuitry 210 for identifying a second word based on the first electronic information, such as "durble" based on the sequence of words that comprises the words "chintith," "durble," "aalochaneey," and "kamzor." In some embodiments, the apparatus may include means, such as the NLI circuitry or the like, for identifying, based on the first electronic information, a tone of the sequence of words provided by the user. For example, the apparatus 200 may comprise NLI circuitry 210 for identifying the tone "sad" based on a sequence of words having a relatively low pitch, a relatively slow pace or speed, a relative emphasis or stress on a particular word such as "kamzor," relative pauses between words, any other suitable information, or any combination thereof.

As shown by operation 706, the apparatus 200 includes means, such as EEI circuitry or the like, for receiving second electronic information indicative of an exogenous event. The EEI circuitry may be any suitable EEI circuitry described herein, such as EEI circuitry 212 described with reference to FIG. 2. The second electronic information may be any suitable electronic information indicative of one or more exogenous events, such as electronic information 400 shown in FIG. 4. The exogenous event may correspond to a global event, a regional event, a user event, any other suitable exogenous event, or any combination thereof. For example, the second electronic information may comprise electronic information indicative of an exogenous event such as "stock market is not performing well." In another example, the second electronic information may comprise electronic information indicative of exogenous events associated with the user's geolocation (e.g., for a user located or domiciled in, or a citizen of, the United States), such as "U.S. stock market is not performing well," "outbreak of Zika near the user's home address," "yesterday was the Super Bowl," "steady U.S. job growth," any other exogenous event, or any combination thereof. In another example, the second electronic information may comprise electronic information indicative of one or more exogenous events associated with the user, such as "looming cash flow crisis," "credit card debt," "recent bonus," any other exogenous event, or any combination thereof. In some embodiments, the apparatus 200 may include means, such as communications circuitry in communication with the EEI circuitry or the like, for receiving the second electronic information. The communications circuitry may be any suitable communications circuitry described herein, such as communications circuitry 208 described with reference to FIG. 2. In some embodiments, the apparatus 200 may receive the second electronic information from a user device (e.g., user device 110), a user support device (e.g., user support device 112), or an exogenous event server device (e.g., exogenous event server device 114) as described in more detail with reference to FIGS. 1 and 2. For example, the server device may transmit the second electronic information to the EEI circuitry of apparatus 200. In other embodiments, the apparatus 200 may receive the second electronic information in response to a request transmitted by the EEI circuitry, as described in more detail with reference to FIG. 9.

As shown by operation 708, the apparatus 200 includes means, such as the EEI circuitry or the like, for identifying the exogenous event based on the second electronic information. For example, the apparatus 200 may comprise EEI circuitry 212 for identifying the exogenous event "stock market is not performing well." In another example, the apparatus 200 may comprise EEI circuitry 212 for identifying exogenous events associated with the user's geolocation (e.g., for a user located or domiciled in, or a citizen of, the United States), such as "U.S. stock market is not performing well," "outbreak of Zika near the user's home address," "yesterday was the Super Bowl," "steady U.S. job growth," any other exogenous event, or any combination thereof. In another example, the apparatus 200 may comprise EEI circuitry 212 for identifying exogenous events associated with the user, such as "looming cash flow crisis," "credit card debt," "recent bonus," any other exogenous event, or any combination thereof. In some instances, the apparatus 200 may comprise EEI circuitry 212 for identifying the exogenous event based on a response received from a remote server (e.g., exogenous event server device 114) after transmitting to the remote server a request for additional information associated with the exogenous event, such as a request for electronic information indicative of the industry or industries associated with the exogenous event "stock market is not performing well."

As shown by operation 710, the apparatus 200 includes means, such as NLA circuitry or the like, for generating one or more natural language attribute data sets based on the identified first word, the identified first language, and the identified exogenous event. In some instances, the apparatus 200 may include means, such as NLA circuitry or the like, for generating one or more natural language attribute data sets based on an identified second word. In some instances, the apparatus 200 may include means, such as NLA circuitry or the like, for generating one or more natural language attribute data sets based on an identified tone. The NLA circuitry may be any suitable NLA circuitry described herein, such as NLA circuitry 214 described with reference to FIG. 2. The one or more natural language attribute data sets may be any suitable one or more data sets, such as one or more of NLA data sets 500, 520, 540, 560, and 580 shown in FIGS. 5A to 5E. In some embodiments, each of the one or more natural language attribute data sets may comprise attribute data for a set of attributes associated with the first word, such as the attribute data 502 for the set of attributes associated with the first word "kamzor" as shown in FIG. 5A. In some instances, the attribute data may comprise a plurality of attribute values for the set of attributes associated with the first word, such as the attribute value 504, attribute value 506, and attribute value 508 shown in FIG. 5A. In some embodiments, the apparatus 200 may include means, such as communications circuitry in communication with the NLA circuitry or the like, for receiving the identified first word and the identified first language from the NLI circuitry and the identified exogenous event from the EEI circuitry. The communications circuitry may be any suitable communications circuitry described herein, such as communications circuitry 208 described with reference to FIG. 2. In some embodiments, the NLA circuitry may be in communication with the NLI circuitry and the EEI circuitry via the processor or communications circuitry of apparatus 200.

As shown by operation 712, the apparatus 200 includes means, such as NLT circuitry or the like, for generating a natural language transliteration data set based on the one or more natural language attribute data sets. The NLT circuitry may be any suitable NLT circuitry described herein, such as NLT circuitry 216 described with reference to FIG. 2. The natural language transliteration data set may be any suitable data set, such as natural language transliteration data set 600 shown in FIG. 6A. In some embodiments, the natural language transliteration data set may comprise correlation data for each of the plurality of possible translations, such as the correlation data 602, the correlation data 604, and the correlation data 606 for the possible translation "gloomy" shown in FIG. 6A. In some instances, the correlation data may comprise one or more deviation data elements for each of the plurality of possible translations. For example, the correlation data 602 may comprise a deviation data element comprising the deviation distance value 610 and the deviation range value 612 for the possible translation "gloomy" shown in FIG. 6A. In some instances, a deviation data element may comprise a deviation distance value and a deviation range value, such as the deviation distance value 610 and the deviation range value 612 shown in FIG. 6A. In some embodiments, the apparatus 200 may include means, such as communications circuitry in communication with the NLT circuitry or the like, for receiving the one or more natural language attribute data sets from the NLA circuitry. The communications circuitry may be any suitable communications circuitry described herein, such as communications circuitry 208 described with reference to FIG. 2. In some embodiments, the NLT circuitry may be in communication with the NLA circuitry via the processor or communications circuitry of apparatus 200.

As shown by operation 714, the apparatus 200 includes means, such as the NLT circuitry or the like, for generating, based on the natural language transliteration data set, a translation of the first word in the second natural language. For example, the apparatus 200 may comprise NLT circuitry 216 for generating, based on the natural language transliteration data set 640 shown in FIG. 6B, the translation "gloomy" for the first word "kamzor" in the second natural language of English. In another example, the apparatus 200 may comprise NLT circuitry 216 for generating the translation based on a mean absolute deviation technique or a median absolute deviation technique. In some embodiments, the apparatus 200 may comprise NLT circuitry 216 for generating the translation by: generating a mean absolute deviation value for each of the plurality of possible translations; selecting one of the plurality of possible translations having a mean absolute deviation value less than all others of the plurality of possible translations; and generating the translation based on the selected possible translation. For example, the NLT circuitry 216 may generate the translation "gloomy" by: generating a mean absolute deviation value for each of the plurality of possible translations 608 shown in FIG. 6A; selecting the possible translation "gloomy" having a mean absolute deviation value less than all others of the plurality of possible translations; and generating the translation based on the selected possible translation. In some embodiments, the apparatus 200 may transmit the translation to TTS circuitry or the like, as described in more detail with reference to FIG. 10.

In some embodiments, operations 704, 704, 706, 708, 710, 712, and 714 may not necessarily occur in the order depicted in FIG. 7, and in some cases one or more of the operations depicted in FIG. 7 may occur substantially simultaneously, or additional steps may be involved before, after, or between any of the operations shown in FIG. 7.

Figure 8:
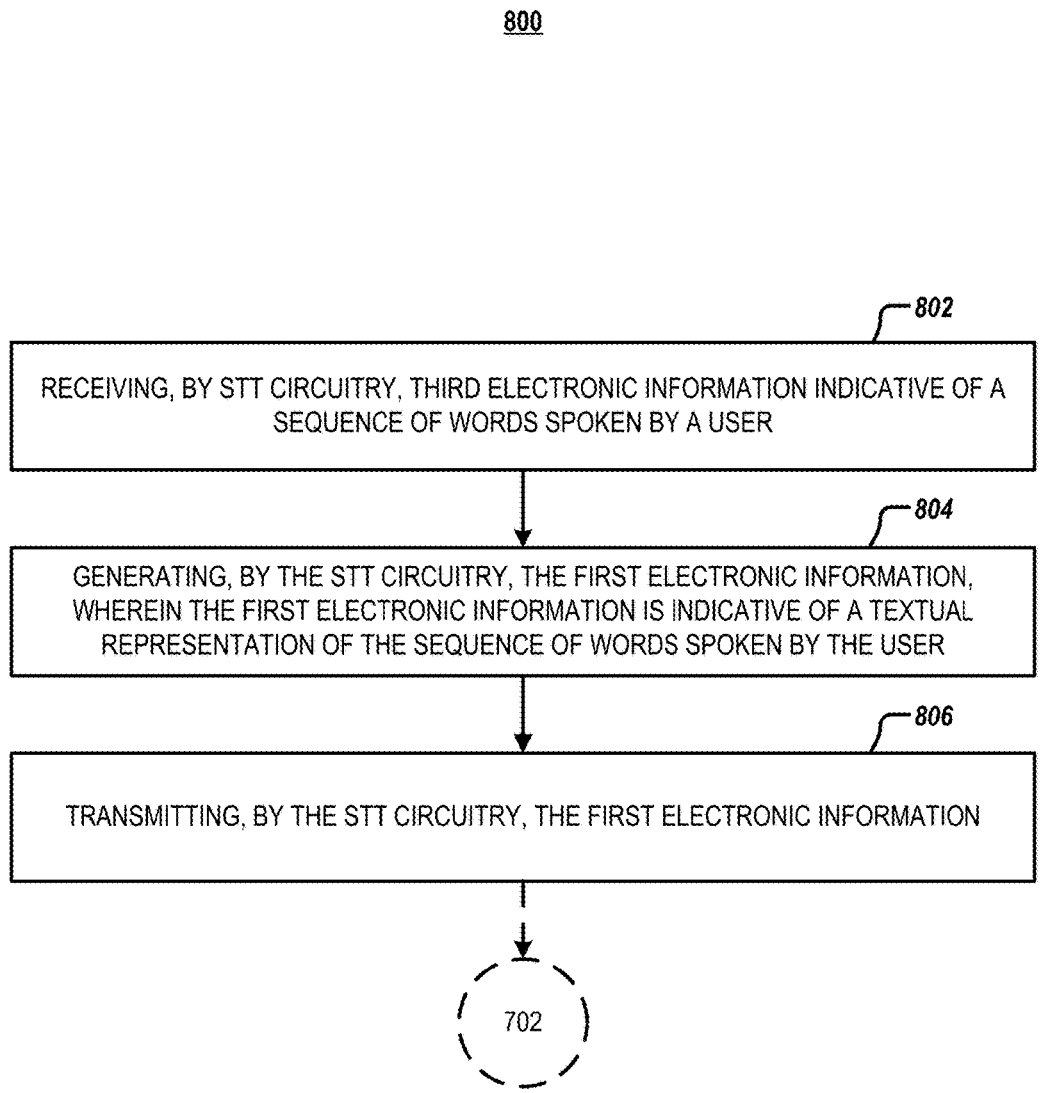
FIG. 8 illustrates an example flowchart for generating electronic information indicative of a textual representation of spoken natural language in accordance with some example embodiments described herein.

Turning to FIG. 8, an example flowchart 800 is illustrated that contains example operations for generating electronic information indicative of a textual representation of spoken natural language according to an example embodiment. The operations illustrated in FIG. 8 may, for example, be performed by one or more components described with reference to NLP system 102 shown in FIG. 1, by a user device 110 or a user support device 112 in communication with NLP system 102, by apparatus 200 shown in FIG. 2, or by any combination thereof. In some embodiments, the various operations described in connection with FIG. 8 may be performed by the apparatus 200 by or through the use of one or more of processing circuitry 202, memory 204, input-output circuitry 206, communications circuitry 208, NLI circuitry 210, EEI circuitry 212, NLA circuitry 214, NLT circuitry 216, STT circuitry 218, TTS circuitry 220, NLR circuitry 222, any other suitable circuitry, and any combination thereof.

As shown by operation 802, the apparatus 200 includes means, such as STT circuitry or the like, for receiving third electronic information indicative of a sequence of words spoken by a user. For example, the third electronic information may comprise analog or digital electronic information indicative the sequence of words "chintith," "durble," "aalochaneey," and "kamzor" spoken by the user. The STT circuitry may be any suitable STT circuitry described herein, such as STT circuitry 218 described with reference to FIG. 2. In some embodiments (such as where the STT circuitry is hosted remotely from a device with which a user directly interacts), the apparatus 200 may include means, such as communications circuitry in communication with the STT circuitry or the like, for receiving the third electronic information indicative of the sequence of words spoken by the user (e.g., where the communications circuitry, in turn, receives the electronic information from a separate device that captures the voice input provided by a user, and that thereafter transmits the electronic information either directly to the communications circuitry or indirectly transmits the electronic information to the communications circuitry via one or more communications networks 108). The communications circuitry may be any suitable communications circuitry described herein, such as communications circuitry 208 described with reference to FIG. 2. Alternatively, this third electronic information may be received from a user via input-output circuitry 206 of the apparatus 200.

As shown by operation 804, the apparatus 200 includes means, such as the STT circuitry or the like, for generating, based on the third electronic information, first electronic information indicative of a textual representation of the sequence of words spoken by the user. For example, the apparatus 200 may comprise STT circuitry 218 for generating, based on the third electronic information, first electronic information comprising digital electronic information indicative of a textual representation of the sequence of words "chintith," "durble," "aalochaneey," and "kamzor" spoken by the user.

As shown by operation 806, the apparatus 200 includes means, such as the STT circuitry or the like, for transmitting the first electronic information. In some embodiments, the apparatus 200 may include means, such as communications circuitry in communication with the STT circuitry or the like, for transmitting the first electronic information. The communications circuitry may be any suitable communications circuitry described herein, such as communications circuitry 208 described with reference to FIG. 2. In some embodiments, the apparatus 200 may transmit the first electronic information to the NLI circuitry or the like, which may receive the first electronic information at operation 702 described with reference to FIG. 7.

In some embodiments, operations 802, 804, and 806 may not necessarily occur in the order depicted in FIG. 8, and in some cases one or more of the operations depicted in FIG. 8 may occur substantially simultaneously, or additional steps may be involved before, after, or between any of the operations shown in FIG. 8. In some embodiments, the operations depicted in FIG. 8 need not occur at all, such as when the sequence of words provided by the user takes the form of text input by the user and thus does not need to be separately converted into a textual representation.

Figure 9:
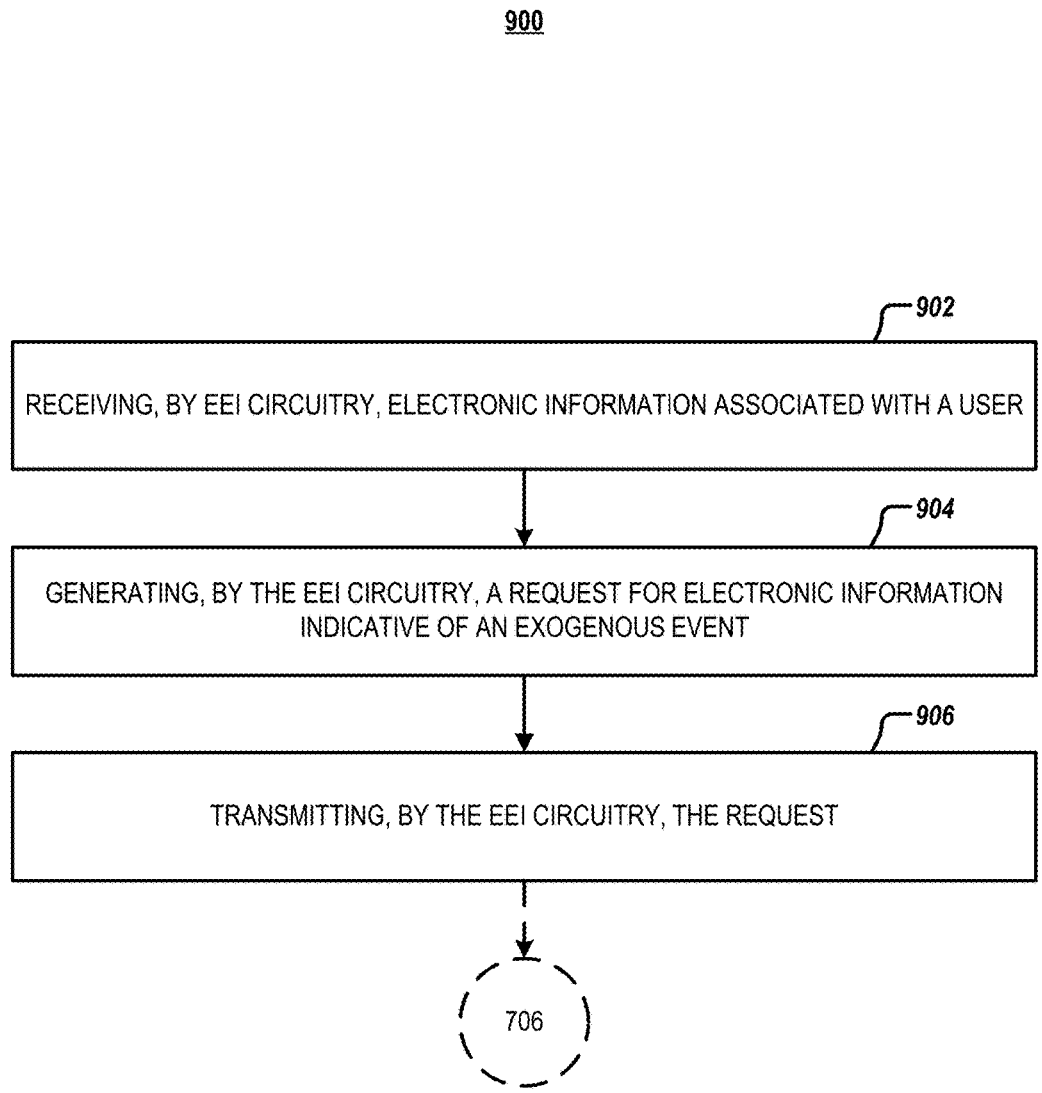
FIG. 9 illustrates an example flowchart for generating a request for electronic information indicative of an exogenous event in accordance with some example embodiments described herein.

Turning to FIG. 9, an example flowchart 900 is illustrated that contains example operations for generating a request for electronic information indicative of an exogenous event according to an example embodiment. The operations illustrated in FIG. 9 may, for example, be performed by one or more components described with reference to NLP system 102 shown in FIG. 1, by a user device 110 or a user support device 112 in communication with NLP system 102, by apparatus 200 shown in FIG. 2, or by any combination thereof. In some embodiments, the various operations described in connection with FIG. 9 may be performed by the apparatus 200 by or through the use of one or more of processing circuitry 202, memory 204, input-output circuitry 206, communications circuitry 208, NLI circuitry 210, EEI circuitry 212, NLA circuitry 214, NLT circuitry 216, STT circuitry 218, TTS circuitry 220, NLR circuitry 222, any other suitable circuitry, and any combination thereof.

As shown by operation 902, the apparatus 200 includes means, such as EEI circuitry or the like, for receiving electronic information associated with a user. The EEI circuitry may be any suitable EEI circuitry described herein, such as EEI circuitry 212 described with reference to FIG. 2. The electronic information associated with the user may be any suitable electronic information associated with any suitable user. In some embodiments, electronic information associated with the user may comprise a user data set (e.g., name, address, account information, and other user data) associated with a user that provided a sequence of words. In some embodiments, the apparatus 200 may include means, such as communications circuitry in communication with the EEI circuitry or the like, for receiving the electronic information associated with the user. The communications circuitry may be any suitable communications circuitry described herein, such as communications circuitry 208 described with reference to FIG. 2. In some embodiments, the apparatus 200 may receive the electronic information associated with the user from a user device (e.g., user device 110), a user support device (e.g., user support device 112), or a user data server device (e.g., user data server device 116) as described in more detail with reference to FIGS. 1 and 2. For example, the server device may transmit the electronic information associated with the user to the EEI circuitry of apparatus 200. In other embodiments, the apparatus 200 may receive the electronic information associated with the user from NLI circuitry (e.g., NLI circuitry 210) as described in more detail with reference to FIG. 2. For example, the NLI circuitry may transmit to the EEI circuitry of apparatus 200 a user data set associated with a user that provided a sequence of words or established a session.

As shown by operation 904, the apparatus 200 includes means, such as the EEI circuitry or the like, for generating a request for electronic information indicative of an exogenous event. In some embodiments, the apparatus 200 may comprise EEI circuitry 212 for generating a request for electronic information indicative of an exogenous event based on the electronic information associated with the user. For example, the request may comprise a request for electronic information indicative of one or more exogenous events associated with the user, such as a cash flow of an account associated with the user, a debt associated with the user, a deposit or bonus associated with the user, a wage or salary associated with the user, one or more stock markets in which one or more assets of the user are invested, or any other suitable information or combination thereof. In another example, the request may comprise a request for electronic information indicative of one or more exogenous events in a geographic region associated with the user, such as the nation, state, province, or within a predetermined distance (e.g., 100 miles) of the address associated with the user. In some instances, the EEI circuitry generating a request for additional information associated with the exogenous event, such as a request for the industry or industries associated with the "stock market is not performing well" exogenous event.

As shown by operation 906, the apparatus 200 includes means, such as the EEI circuitry or the like, for transmitting the request. In some embodiments, the apparatus 200 may include means, such as communications circuitry in communication with the EEI circuitry or the like, for transmitting the request. The communications circuitry may be any suitable communications circuitry described herein, such as communications circuitry 208 described with reference to FIG. 2. In some embodiments, the apparatus 200 may transmit the request to an exogenous event server device (e.g., exogenous event server device 114) as described in more detail with reference to FIGS. 1 and 2. The exogenous event server device may receive the request and, in response, transmit the second electronic information indicative of an exogenous event to the EEI circuitry, which may receive the second electronic information at operation 706 described with reference to FIG. 7.

In some embodiments, operations 902, 904, and 906 may not necessarily occur in the order depicted in FIG. 9, and in some cases one or more of the operations depicted in FIG. 9 may occur substantially simultaneously, or additional steps may be involved before, after, or between any of the operations shown in FIG. 9.

Figure 10:
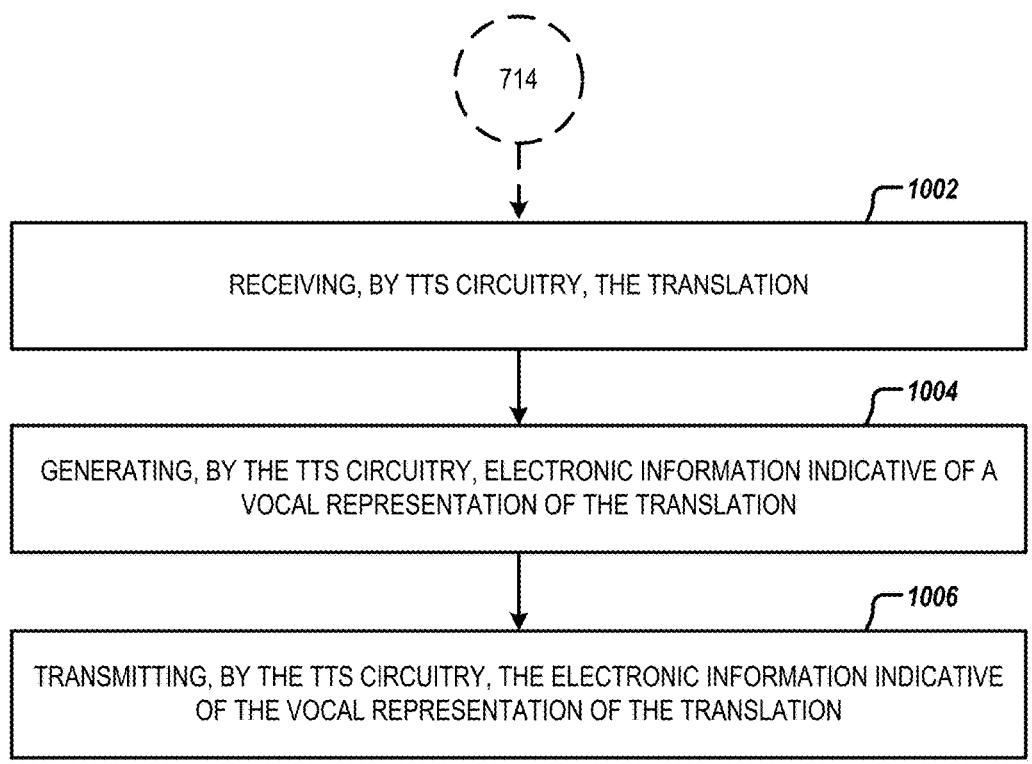
FIG. 10 illustrates an example flowchart for generating electronic information indicative of a vocal representation of a translation in accordance with some example embodiments described herein.

Turning to FIG. 10, an example flowchart 1000 is illustrated that contains example operations for generating electronic information indicative of a vocal representation of a translation according to an example embodiment. The operations illustrated in FIG. 10 may, for example, be performed by one or more components described with reference to NLP system 102 shown in FIG. 1, by a user device 110 or a user support device 112 in communication with NLP system 102, by apparatus 200 shown in FIG. 2, or by any combination thereof. In some embodiments, the various operations described in connection with FIG. 10 may be performed by the apparatus 200 by or through the use of one or more of processing circuitry 202, memory 204, input-output circuitry 206, communications circuitry 208, NLI circuitry 210, EEI circuitry 212, NLA circuitry 214, NLT circuitry 216, STT circuitry 218, TTS circuitry 220, NLR circuitry 222, any other suitable circuitry, and any combination thereof.

As shown by operation 1002, the apparatus 200 includes means, such as TTS circuitry or the like, for receiving the translation. The TTS circuitry may be any suitable TTS circuitry described herein, such as TTS circuitry 220 described with reference to FIG. 2. In some embodiments, the apparatus 200 may include means, such as communications circuitry in communication with the TTS circuitry or the like, for receiving the translation. The communications circuitry may be any suitable communications circuitry described herein, such as communications circuitry 208 described with reference to FIG. 2. For example, the TTS circuitry may receive the translation from NLT circuitry or the like (e.g., after operation 714 described with reference to FIG. 7).

As shown by operation 1004, the apparatus 200 includes means, such as TTS circuitry or the like, for generating, based on the translation, electronic information indicative of a vocal representation of the translation. This electronic information indicative of the vocal representation of the translation may be generated using a map, database, or lookup table that receives the translation and maps it to a corresponding set of electronic information indicative of the vocal representation of the received translation. Alternatively, the electronic information indicative of the vocal representation may be an identifier uniquely identifying the vocal representation in a database.

As shown by operation 1006, the apparatus 200 includes means, such as TTS circuitry or the like, for transmitting the electronic information indicative of the vocal representation of the translation. In embodiments in which the user directly interacts with the apparatus 200, the electronic information may be transmitted by producing an audio output of a vocal representation of the translation via input-output circuitry 206. In embodiments in which the user does not directly interact with the apparatus 200 (e.g., the apparatus 200 comprises a cloud server, but the user interacts with a user device 110 or a user support device 112 that is in communication with the cloud server), the apparatus 200 may include means, such as communications circuitry in communication with the TTS circuitry or the like, for transmitting the electronic information indicative of the vocal representation of the translation. The communications circuitry may be any suitable communications circuitry described herein, such as communications circuitry 208 described with reference to FIG. 2. For example, the TTS circuitry may transmit the electronic information indicative of the vocal representation of the translation to the user device 110 or the user support device 112 for audio output via input-output circuitry comprised by the user device 110 or the user support device 112.

In some embodiments, operations 1002, 1004, and 1006 may not necessarily occur in the order depicted in FIG. 10, and in some cases one or more of the operations depicted in FIG. 10 may occur substantially simultaneously, or additional steps may be involved before, after, or between any of the operations shown in FIG. 10.

Figure 11:
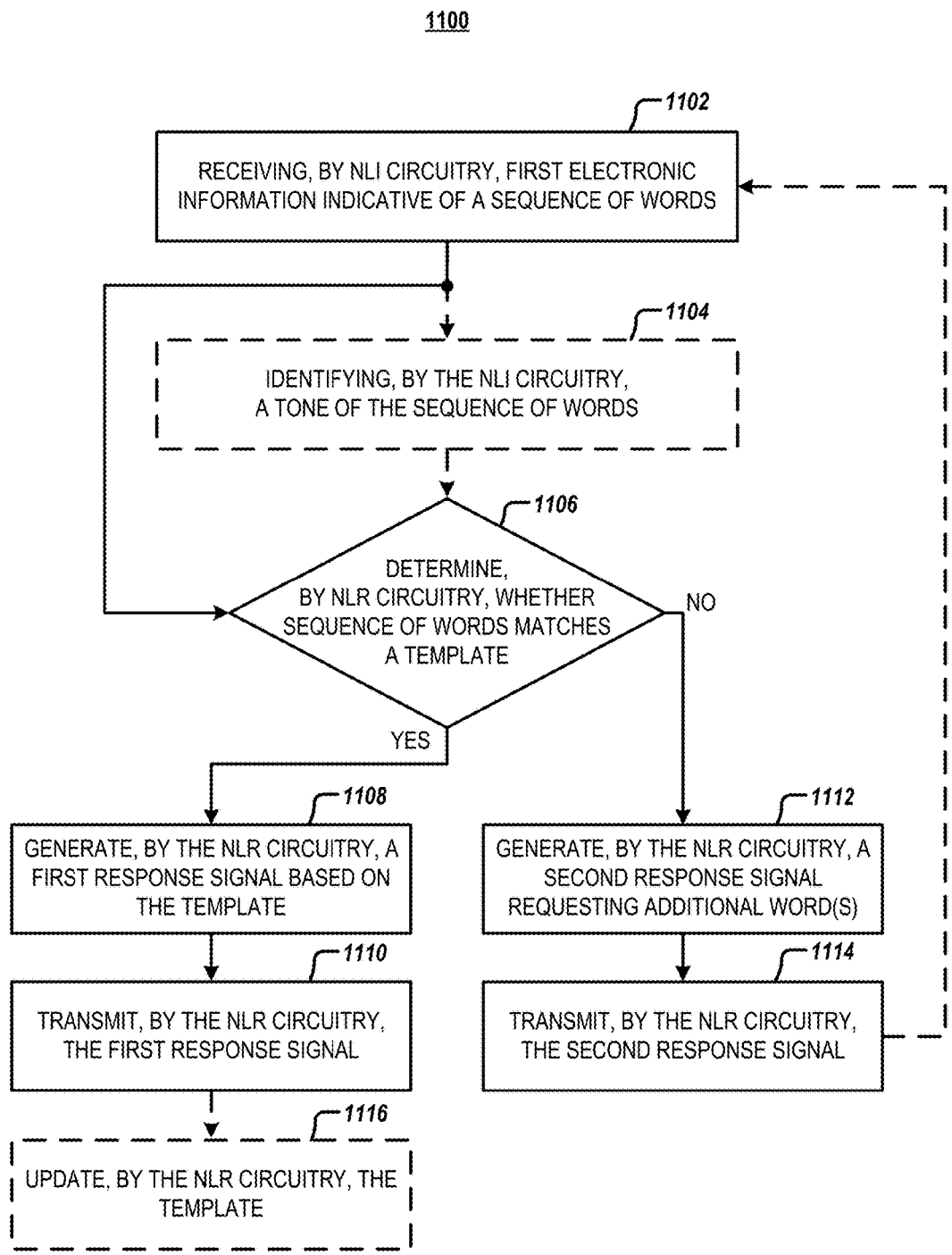
FIG. 11 illustrates an example flowchart for generating a response signal based on a template in accordance with some example embodiments described herein.

Turning to FIG. 11, an example flowchart 1100 is illustrated that contains example operations for generating a response signal based on a template according to an example embodiment. The operations illustrated in FIG. 11 may, for example, be performed by one or more components described with reference to NLP system 102 shown in FIG. 1, by a user device 110 or a user support device 112 in communication with NLP system 102, by apparatus 200 shown in FIG. 2, or by any combination thereof. In some embodiments, the various operations described in connection with FIG. 11 may be performed by the apparatus 200 by or through the use of one or more of processing circuitry 202, memory 204, input-output circuitry 206, communications circuitry 208, NLI circuitry 210, EEI circuitry 212, NLA circuitry 214, NLT circuitry 216, STT circuitry 218, TTS circuitry 220, NLR circuitry 222, any other suitable circuitry, and any combination thereof.

As shown by operation 1102, the apparatus 200 includes means, such as NLI circuitry or the like, for receiving first electronic information indicative of a sequence of words provided by a user. The NLI circuitry may be any suitable NLI circuitry described herein, such as NLI circuitry 210 described with reference to FIG. 2. The sequence of words may be any suitable sequence of words, such as the sequence of words described with reference to electronic information 300 shown in FIG. 3A. For example, the sequence of words may comprise the words "chintith," "durble," "aalochaneey," and "kamzor" in the natural language of Hindi. In some embodiments, the apparatus 200 may include means, such as communications circuitry in communication with the NLI circuitry or the like, for receiving the first electronic information. The communications circuitry may be any suitable communications circuitry described herein, such as communications circuitry 208 described with reference to FIG. 2. In some embodiments, the apparatus 200 may receive the first electronic information from a user device (e.g., user device 110) or a user support device (e.g., user support device 112), as described in more detail with reference to FIGS. 1 and 2. For example, the user device or the user support device may transmit the first electronic information to the NLI circuitry of apparatus 200. In other embodiments, the apparatus 200 may receive the first electronic information from STT circuitry, as described in more detail with reference to FIG. 8. For example, the STT circuitry may transmit the first electronic information to the NLI circuitry of apparatus 200.

Optionally, as shown by operation 1104, the apparatus 200 may include means, such as the NLI circuitry or the like, for identifying a tone of the sequence of words based on the first electronic information. For example, the apparatus 200 may comprise NLI circuitry 210 for identifying the tone "sad" based on a sequence of words having a relatively low pitch, a relatively slow pace or speed, a relative emphasis or stress on a particular word such as "kamzor," relative pauses between words, any other suitable information, or any combination thereof. Operation 1104 may be optional in some embodiments, as described in greater detail below.

As shown by operation 1106, the apparatus 200 includes means, such as NLR circuitry or the like, for determining whether the sequence of words matches a template. This determination may in some embodiments be based on the first electronic information alone, while in other embodiments it may be based on the first electronic information and the identified tone. The NLR circuitry may be any suitable NLR circuitry described herein, such as NLR circuitry 222 described with reference to FIG. 2. The template may be any suitable template described herein. In some embodiments, the apparatus 200 may include means, such as communications circuitry in communication with the NLR circuitry or the like, for receiving the first electronic information and the identified tone from the NLI. The communications circuitry may be any suitable communications circuitry described herein, such as communications circuitry 208 described with reference to FIG. 2. In some embodiments, the NLR circuitry may be in communication with the NLI circuitry via the processor or communications circuitry of apparatus 200. If at operation 1106 the apparatus determines that the sequence of words matches a template, the method may proceed to operation 1108. If at operation 1106 the apparatus determines that the sequence of words does not match a template, the method may proceed to operation 1112.

As shown by operation 1108, the apparatus 200 includes means, such as the NLR circuitry or the like, for generating, based on the template, a first response signal. For example, the apparatus 200 may comprise NLR circuitry 222 for generating a first response signal comprising the sequence of words "Everything will be okay, let me transfer you to a representative" based on the sequence of words "my mortgage is stressing me out" in the natural language of English and the tone "worried."

As shown by operation 1110, the apparatus 200 includes means, such as the NLR circuitry or the like, for transmitting the first response signal. In embodiments in which the user directly interacts with the apparatus 200, the first response signal may be transmitted by producing an audio output of a vocal representation of the first response signal via input-output circuitry 206. In embodiments in which the user does not directly interact with the apparatus 200 (e.g., the apparatus 200 comprises a cloud server, but the user interacts with a user device 110 or a user support device 112 that is in communication with the cloud server), the apparatus 200 may include means, such as communications circuitry in communication with the NLR circuitry or the like, for transmitting the first response signal. The communications circuitry may be any suitable communications circuitry described herein, such as communications circuitry 208 described with reference to FIG. 2. For example, the NLR circuitry may transmit the first response signal to a user device 110 or a user support device 112 for audio output via input-output circuitry comprised by the user device 110 or the user support device 112. In another example, the apparatus 200 may transmit the first response signal to TTS circuitry or the like, as described in more detail with reference to FIG. 10.

As shown by operation 1112, the apparatus 200 includes means, such as the NLR circuitry or the like, for generating a second response signal requesting additional information, such as one or more additional words to be provided by the user. For example, the apparatus 200 may comprise NLR circuitry 222 for generating a second response signal comprising the sequence of words "I am having difficulty understanding you. Can you say that again?" based on the sequence of words "my mortgage is freaking me out" in the natural language of English and the tone "scared." In another example, the apparatus 200 may comprise NLR circuitry 222 for generating a second response signal comprising the sequence of words "Did you mean to say that your mortgage is stressing you out?" based on the sequence of words "my mortgage is freaking me out" in the natural language of English and the tone "worried."

As shown by operation 1114, the apparatus 200 includes means, such as the NLR circuitry or the like, for transmitting the second response signal. In embodiments in which the user directly interacts with the apparatus 200, the second response signal may be transmitted by producing an audio output of a vocal representation of the second response signal via input-output circuitry 206. In embodiments in which the user does not directly interact with the apparatus 200 (e.g., the apparatus 200 comprises a cloud server, but the user interacts with a user device 110 or a user support device 112 that is in communication with the cloud server), the apparatus 200 may include means, such as communications circuitry in communication with the NLR circuitry or the like, for transmitting the second response signal. The communications circuitry may be any suitable communications circuitry described herein, such as communications circuitry 208 described with reference to FIG. 2. For example, the NLR circuitry may transmit the second response signal to a user device 110 or a user support device 112 for audio output via input-output circuitry comprised by the user device 110 or the user support device 112. In another example, the apparatus 200 may transmit the second response signal to TTS circuitry or the like, as described in more detail with reference to FIG. 10.

Optionally, as shown by operation 1116, the apparatus 200 may include means, such as the NLR circuitry or the like, for updating the template. In some embodiments, such as when the NLR circuitry subsequently determines that a second sequence of words (e.g., a second sequence of words provided by the user in response to the second response signal transmitted by the NLR circuitry at operation 1114) matches a template, the NLR circuitry may update the template by associating the first sequence of words (e.g., the first sequence of words that the NLR circuitry previously determined did not match any known template) with the template such that the first sequence of words will match the template in the future. For example, the apparatus 200 may comprise NLR circuitry 222 for updating the template such that NLR circuitry 222 is configured to generate, at a subsequently performed operation 1108, a first response signal comprising the sequence of words "Everything will be okay, let me transfer you to a representative" based on the sequence of words "my mortgage is freaking me out" in the natural language of English and the tone "scared." In contrast to the embodiments disclosed herein, conventional natural language processing systems are not able to translate the phrase "freaked out" into another language in ways that retain the particular nuances of the phase "freaked out."

In some embodiments, operations 1102, 1104, 1106, 1108, 1110, 1112, 1114, and 1116 may not necessarily occur in the order depicted in FIG. 11, and in some cases one or more of the operations depicted in FIG. 11 may occur substantially simultaneously, or additional steps may be involved before, after, or between any of the operations shown in FIG. 11. Moreover, although FIG. 11 illustrates operations 1104 and 1106 as occurring after operation 1102, this is for ease of explanation only, and multiple embodiments are contemplated here. For instance, in some embodiments, operation 1104 occurs prior to performance of operation 1106, in which case the tone identified in operation 1104 informs the determination taking place in operation 1106. In other embodiments, operation 1104 need not occur at all (and this may be by design in some embodiments, and in some embodiments this may be because there are fewer than a threshold number of words in the sequence of words (e.g., when there is only one word in the sequence)), and instead the procedure advances directly from operation 1102 to operation 1106. Finally, in some embodiments, operation 1104 may be performed but may not succeed in identifying a tone, in which case the procedure advances thereafter to operation 1106, but operation 1106 is performed in the same fashion as in embodiments where operation 1104 was not performed.

Figure 12:
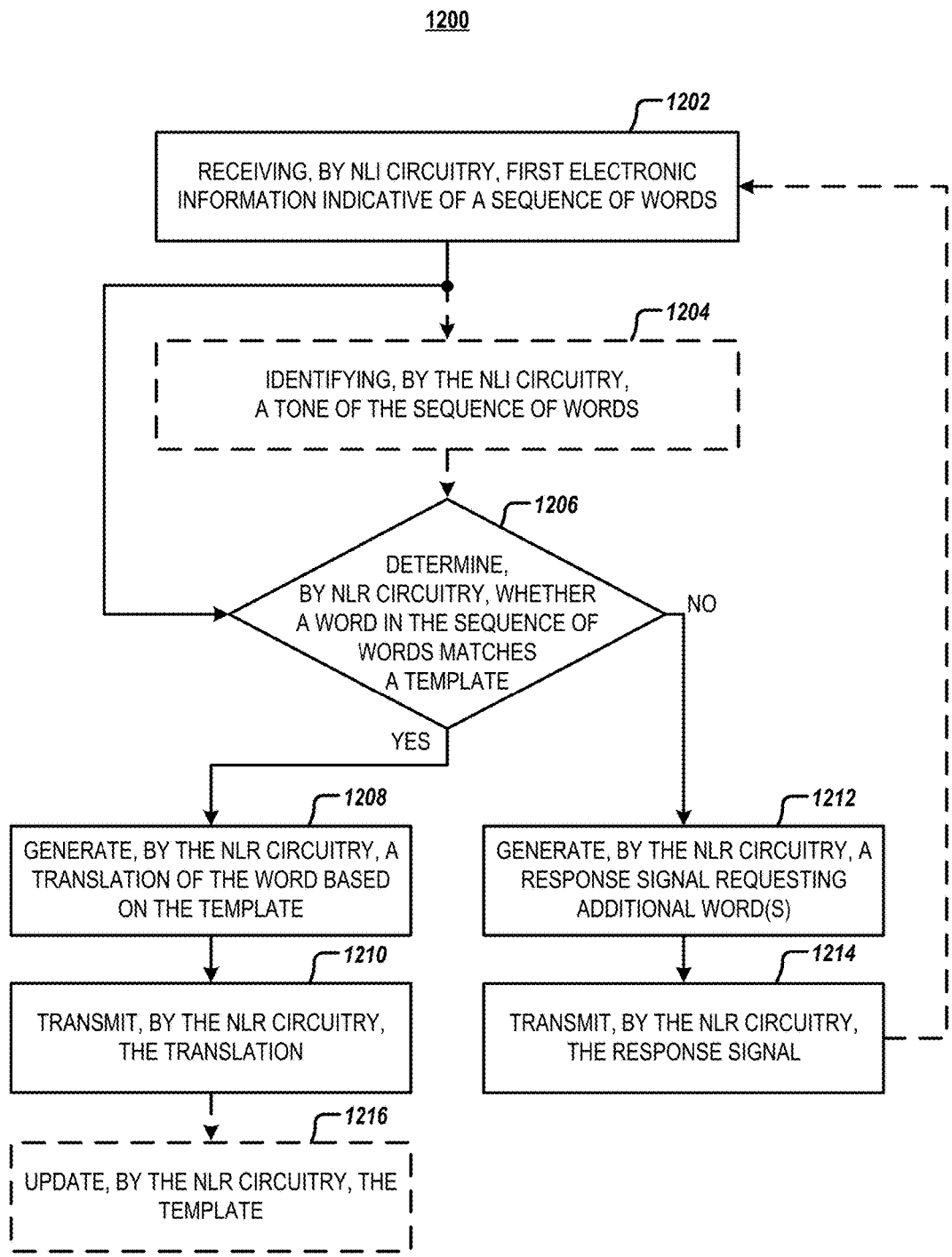
FIG. 12 illustrates an example flowchart for generating a nuanced translation of a word based on a template in accordance with some example embodiments described herein.

Turning to FIG. 12, an example flowchart 1200 is illustrated that contains example operations for generating a nuanced translation of a word based on a template according to an example embodiment. The operations illustrated in FIG. 12 may, for example, be performed by one or more components described with reference to NLP system 102 shown in FIG. 1, by a user device 110 or a user support device 112 in communication with NLP system 102, by apparatus 200 shown in FIG. 2, or by any combination thereof. In some embodiments, the various operations described in connection with FIG. 12 may be performed by the apparatus 200 by or through the use of one or more of processing circuitry 202, memory 204, input-output circuitry 206, communications circuitry 208, NLI circuitry 210, EEI circuitry 212, NLA circuitry 214, NLT circuitry 216, STT circuitry 218, TTS circuitry 220, NLR circuitry 222, any other suitable circuitry, and any combination thereof.

As shown by operation 1202, the apparatus 200 includes means, such as NLI circuitry or the like, for receiving first electronic information indicative of a sequence of words provided by a user. The NLI circuitry may be any suitable NLI circuitry described herein, such as NLI circuitry 210 described with reference to FIG. 2. The sequence of words may be any suitable sequence of words, such as the sequence of words described with reference to electronic information 300 shown in FIG. 3A. For example, the sequence of words may comprise the word "kamzor" and one or more other words in the natural language of Hindi. In some embodiments, the apparatus 200 may include means, such as communications circuitry in communication with the NLI circuitry or the like, for receiving the first electronic information. The communications circuitry may be any suitable communications circuitry described herein, such as communications circuitry 208 described with reference to FIG. 2. In some embodiments, the apparatus 200 may receive the first electronic information from a user device (e.g., user device 110) or a user support device (e.g., user support device 112), as described in more detail with reference to FIGS. 1 and 2. For example, the user device or the user support device may transmit the first electronic information to the NLI circuitry of apparatus 200. In other embodiments, the apparatus 200 may receive the first electronic information from STT circuitry, as described in more detail with reference to FIG. 8. For example, the STT circuitry may transmit the first electronic information to the NLI circuitry of apparatus 200.

Optionally, as shown by operation 1204, the apparatus 200 may include means, such as the NLI circuitry or the like, for identifying a tone of the sequence of words, or a tone of a word in the sequence of words, based on the first electronic information. For example, the apparatus 200 may comprise NLI circuitry 210 for identifying the tone "sad" based on a sequence of words having a relatively low pitch, a relatively slow pace or speed, a relative emphasis or stress on a particular word such as "kamzor," relative pauses between words, any other suitable information, or any combination thereof. In another example, the apparatus 200 may comprise NLI circuitry 210 for identifying the tone "angry" based on a word having a relatively high pitch, a relatively fast pace or speed, a relative emphasis or stress on the word, relative pauses before or after the word, any other suitable information, or any combination thereof. Operation 1204 may be optional in some embodiments, as described in greater detail below.

As shown by operation 1206, the apparatus 200 includes means, such as NLR circuitry or the like, for determining whether a word in the sequence of words matches a template. This determination may in some embodiments be based on the first electronic information alone, while in other embodiments it may be based on the first electronic information and the identified tone. The NLR circuitry may be any suitable NLR circuitry described herein, such as NLR circuitry 222 described with reference to FIG. 2. The template may be any suitable template described herein. For example, the template may be a shorthand for identifying a correct nuanced translation of the word without performing some or all of the procedures described with reference to NLA circuitry 214 and NLT circuitry 216 or FIGS. 5A-6C. In some embodiments, the apparatus 200 may include means, such as communications circuitry in communication with the NLR circuitry or the like, for receiving the first electronic information and the identified tone from the NLI. The communications circuitry may be any suitable communications circuitry described herein, such as communications circuitry 208 described with reference to FIG. 2. In some embodiments, the NLR circuitry may be in communication with the NLI circuitry via the processor or communications circuitry of apparatus 200. If at operation 1206 the apparatus determines that the word matches a template, the method may proceed to operation 1208. If at operation 1206 the apparatus determines that the word does not match a template, the method may proceed to operation 1212.

As shown by operation 1208, the apparatus 200 includes means, such as the NLR circuitry or the like, for generating, based on the template, a translation of the word. For example, the apparatus 200 may comprise NLR circuitry 222 for generating the properly nuanced English translation "gloomy" of the Hindi word "kamzor" based on the template for the word "kamzor."

As shown by operation 1210, the apparatus 200 includes means, such as the NLR circuitry or the like, for transmitting the translation. In embodiments in which the user directly interacts with the apparatus 200, the translation may be transmitted by producing an audio output of a vocal representation of the translation via input-output circuitry 206. In embodiments in which the user does not directly interact with the apparatus 200 (e.g., the apparatus 200 comprises a cloud server, but the user interacts with a user device 110 or a user support device 112 that is in communication with the cloud server), the apparatus 200 may include means, such as communications circuitry in communication with the NLR circuitry or the like, for transmitting the translation. The communications circuitry may be any suitable communications circuitry described herein, such as communications circuitry 208 described with reference to FIG. 2. For example, the NLR circuitry may transmit the translation to a user device 110 or a user support device 112 for audio output via input-output circuitry comprised by the user device 110 or the user support device 112. In another example, the apparatus 200 may transmit the translation to TTS circuitry or the like, as described in more detail with reference to FIG. 10.

As shown by operation 1212, the apparatus 200 includes means, such as the NLR circuitry or the like, for generating a response signal requesting additional information, such as one or more additional words to be provided by the user. For example, the apparatus 200 may comprise NLR circuitry 222 for generating a response signal comprising the sequence of words "I am having difficulty understanding you. Can you say that again?" based on the word "kamzor" in the natural language of Hindi and the tone "perplexed."

As shown by operation 1214, the apparatus 200 includes means, such as the NLR circuitry or the like, for transmitting the response signal. In embodiments in which the user directly interacts with the apparatus 200, the response signal may be transmitted by producing an audio output of a vocal representation of the response signal via input-output circuitry 206. In embodiments in which the user does not directly interact with the apparatus 200 (e.g., the apparatus 200 comprises a cloud server, but the user interacts with a user device 110 or a user support device 112 that is in communication with the cloud server), the apparatus 200 may include means, such as communications circuitry in communication with the NLR circuitry or the like, for transmitting the response signal. The communications circuitry may be any suitable communications circuitry described herein, such as communications circuitry 208 described with reference to FIG. 2. For example, the NLR circuitry may transmit the response signal to a user device 110 or a user support device 112 for audio output via input-output circuitry comprised by the user device 110 or the user support device 112. In another example, the apparatus 200 may transmit the response signal to TTS circuitry or the like, as described in more detail with reference to FIG. 10.

Optionally, as shown by operation 1216, the apparatus 200 may include means, such as the NLR circuitry or the like, for updating the template. In some embodiments, such as when the NLR circuitry subsequently determines that a second word in a second sequence of words (e.g., a second sequence of words provided by the user in response to the second response signal transmitted by the NLR circuitry at operation 1214) matches a template, the NLR circuitry may update the template by associating the first word (e.g., the word that the NLR circuitry previously determined did not match any known template) with the template such that the first word will match the template in the future. For example, the apparatus 200 may comprise NLR circuitry 222 for updating the template such that NLR circuitry 222 is configured to generate, at a subsequently performed operation 1208, the English translation "gloomy" based on the Hindi word "kamzor" and the tone "perplexed." In contrast to the embodiments disclosed herein, conventional natural language processing systems are not able to translate the word "kamzor" into another language in ways that retain the particular nuances of that word.

In some embodiments, operations 1202, 1204, 1206, 1208, 1210, 1212, 1214, and 1216 may not necessarily occur in the order depicted in FIG. 12, and in some cases one or more of the operations depicted in FIG. 12 may occur substantially simultaneously, or additional steps may be involved before, after, or between any of the operations shown in FIG. 12. Moreover, although FIG. 12 illustrates operations 1204 and 1206 as occurring after operation 1202, this is for ease of explanation only, and multiple embodiments are contemplated here. For instance, in some embodiments, operation 1204 occurs prior to performance of operation 1206, in which case the tone identified in operation 1204 informs the determination taking place in operation 1206. In other embodiments, operation 1204 need not occur at all (and this may be by design in some embodiments, and in some embodiments this may be because there are fewer than a threshold number of words in the sequence of words (e.g., when there is only one word in the sequence)), and instead the procedure advances directly from operation 1202 to operation 1206. Finally, in some embodiments, operation 1204 may be performed but may not succeed in identifying a tone, in which case the procedure advances thereafter to operation 1206, but operation 1206 is performed in the same fashion as in embodiments where operation 1204 was not performed.

FIGS. 7-12 thus illustrate flowcharts describing the operation of various systems (e.g., natural language processing system 102 described with reference to FIG. 1), apparatuses (e.g., apparatus 200 described with reference to FIG. 2), methods, and computer program products according to example embodiments contemplated herein. It will be understood that each operation of the flowcharts, and combinations of operations in the flowcharts, may be implemented by various means, such as hardware, firmware, processor, circuitry, and/or other devices associated with execution of software including one or more computer program instructions. For example, one or more of the procedures described above may be performed by execution of computer program instructions. In this regard, the computer program instructions that, when executed, cause performance of the procedures described above may be stored by a memory (e.g., memory 204) of an apparatus (e.g., apparatus 200) and executed by a processor (e.g., processing circuitry 202) of the apparatus. As will be appreciated, any such computer program instructions may be loaded onto a computer or other programmable apparatus (e.g., hardware) to produce a machine, such that the resulting computer or other programmable apparatus implements the functions specified in the flowchart operations. These computer program instructions may also be stored in a computer-readable memory that may direct a computer or other programmable apparatus to function in a particular manner, such that the instructions stored in the computer-readable memory produce an article of manufacture, the execution of which implements the functions specified in the flowchart operations. The computer program instructions may also be loaded onto a computer or other programmable apparatus to cause a series of operations to be performed on the computer or other programmable apparatus to produce a computer-implemented process such that the instructions executed on the computer or other programmable apparatus provide operations for implementing the functions specified in the flowchart operations.

The flowchart operations described with reference to FIGS. 7-12 support combinations of means for performing the specified functions and combinations of operations for performing the specified functions. It will be understood that one or more operations of the flowcharts, and combinations of operations in the flowcharts, can be implemented by special purpose hardware-based computer systems which perform the specified functions, or combinations of special purpose hardware and computer instructions.

In one illustrative and non-limiting example, the NLP system described herein, such as NLP system 102 described with reference to FIG. 1, may provide for using a Naïve Bayes algorithm and training the various models disclosed herein with enough data regarding the context typical to a particular sector, such as the bank sector. In some instances, all of the properties (e.g., in the natural language attribute (NLA) tables described below with reference to FIGS. 5A-5E) contribute to the probability that the translated word generated by the NLP system 102, after considering the various nuances of the word, is correct. Whenever a customer comes into a bank and speaks to a chatbot, or uses chat to communicate, the NLP system 102 may use parts of the speech spoken by the customer to get the idea about the main content of the speech using meronym, hypernyms, verbs, and other information using, for example, a Naïve Bayes algorithm. The meronym may be 'part of' {"sitting on", "my head"}, which may be part of "stressing me." The hypernym may be a 'type of' {"durble", "aalochaneey", "kamzor", "chintith"}, which may be a type of "weak" or "sad." Once the NLP system 102 detects the main content of the speech, the NLP system may match the detected main content with the pre-existing templates (or templates created for users by the NLP system 102) and respond appropriately. In some instances, the tone of the person can vary and the NLP system 102 may provide for analyzing the tone and sentiments of the customer's speech. If the conversation is speech-based, then sample speeches of sentiments or tone will be made available to the NLP system 102 such as 'Sad', 'Happy', 'Neutral' and other suitable sample speeches. For example, when a customer comes in to a bank, and speaks in angry voice, the NLP system 102 may compare the tone of the customer's speech with the sample speeches it has and respond appropriately. If the NLP system 102 is unable to find any matching tone or a matching template or fails to understand what the customer is saying, the NLP system may provide a default response, such as 'I can't understand you—Please try in a different way.' If the customer then speaks in a different way; the NLP system 102 may find a matching template and return with an answer. If the answer is correct and user is satisfied, the NLP system 102 may then train itself with the previous user input that the NLP system 102 previously could not understand and save that in its memory. So next time, if the same user comes back or any other user comes back and speaks that word or sentence, the NLP system 102 may find a matching template. The NLP system 102 may keep training itself by passing time with user input and may continue to broaden its memory and become more accurate.

CONCLUSION

While various embodiments in accordance with the principles disclosed herein have been shown and described above, modifications thereof may be made by one skilled in the art without departing from the teachings of the disclosure. The embodiments described herein are representative only and are not intended to be limiting. Many variations, combinations, and modifications are possible and are within the scope of the disclosure. Alternative embodiments that result from combining, integrating, and/or omitting features of the embodiment(s) are also within the scope of the disclosure. Accordingly, the scope of protection is not limited by the description set out above, but is defined by the claims which follow, that scope including all equivalents of the subject matter of the claims. Each and every claim is incorporated as further disclosure into the specification and the claims are embodiment(s) of the present disclosure. Furthermore, any advantages and features described above may relate to specific embodiments, but shall not limit the application of such issued claims to processes and structures accomplishing any or all of the above advantages or having any or all of the above features.

In addition, the section headings used herein are provided for consistency with the suggestions under 37 C.F.R. 1.77 or to otherwise provide organizational cues. These headings shall not limit or characterize the disclosure set out in any claims that may issue from this disclosure. For instance, a description of a technology in the "Background" is not to be construed as an admission that certain technology is prior art to any disclosure in this disclosure. Neither is the "Summary" to be considered as a limiting characterization of the disclosure set forth in issued claims. Furthermore, any reference in this disclosure to "disclosure" or "embodiment" in the singular should not be used to argue that there is only a single point of novelty in this disclosure. Multiple embodiments of the present disclosure may be set forth according to the limitations of the multiple claims issuing from this disclosure, and such claims accordingly define the disclosure, and their equivalents, that are protected thereby. In all instances, the scope of the claims shall be considered on their own merits in light of this disclosure, but should not be constrained by the headings set forth herein.

Also, techniques, systems, subsystems, and methods described and illustrated in the various embodiments as discrete or separate may be combined or integrated with other systems, modules, techniques, or methods without departing from the scope of the present disclosure. Other devices or components shown or discussed as coupled to, or in communication with, each other may be indirectly coupled through some intermediate device or component, whether electrically, mechanically, or otherwise. Other examples of changes, substitutions, and alterations are ascertainable by one skilled in the art and could be made without departing from the scope disclosed herein.

Many modifications and other embodiments of the disclosure set forth herein will come to mind to one skilled in the art to which these embodiments pertain having the benefit of teachings presented in the foregoing descriptions and the associated figures. Although the figures only show certain components of the apparatus and systems described herein, it is understood that various other components may be used in conjunction with the supply management system. Therefore, it is to be understood that the disclosure is not to be limited to the specific embodiments disclosed and that modifications and other embodiments are intended to be included within the scope of the appended claims. For example, the various elements or components may be combined, rearranged, or integrated in another system or certain features may be omitted or not implemented. Moreover, the steps in any method described above may not necessarily occur in the order depicted in the accompanying figures, and in some cases one or more of the steps depicted may occur substantially simultaneously, or additional steps may be involved. Although specific terms are employed herein, they are used in a generic and descriptive sense only and not for purposes of limitation.

What is claimed is:

1. A system for processing electronic information indicative of natural language, the system comprising:
   natural language identification (NLI) circuitry configured to
      receive first electronic information indicative of a sequence of words provided by a user, wherein the sequence of words comprises a first word in a first natural language, and wherein the first word corresponds to a plurality of possible translations in a second natural language,
      generate a first identification of the first word based on the first electronic information, and
      generate a second identification of the first natural language based on the first electronic information;
   exogenous event identification (EEI) circuitry configured to
      receive second electronic information indicative of an exogenous event, and
      generate, based on the second electronic information, a third identification representing the exogenous event;
   natural language attribute (NLA) circuitry in communication with the NLI circuitry and the EEI circuitry, wherein the NLA circuitry is configured to
      generate, based on the first identification of the first word, the second identification of the first natural language, and the third identification representing the exogenous event, one or more natural language attribute data sets, wherein each of the one or more natural language attribute data sets comprises attribute data for a set of attributes associated with the first word; and
   natural language transliteration (NLT) circuitry in communication with the NLA circuitry, wherein the NLT circuitry is configured to
      generate, based on the one or more natural language attribute data sets, a natural language transliteration data set comprising correlation data for each of the plurality of possible translations; and
      generate, based on the natural language transliteration data set, a translation of the first word in the second natural language.

2. The system of claim 1, wherein the NLT circuitry is further configured to transmit the translation, and wherein the system further comprises text-to-speech (TTS) circuitry in communication with the NLT circuitry, wherein the TTS circuitry is configured to:
   receive the translation; and
   generate, based on the translation, third electronic information indicative of a vocal representation of the translation.

3. The system of claim 1, wherein the NLI circuitry is further configured to generate, based on the first electronic information, a fourth identification of a tone of the sequence of words provided by the user, and wherein the NLA circuitry is further configured to generate the one or more natural language attribute data sets based on the fourth identification of the tone.

4. The system of claim 1, wherein the sequence of words comprises a second word in the first natural language, wherein the NLI circuitry is further configured to generate a fourth identification of the second word based on the first electronic information, and wherein the NLA circuitry is further configured to generate the one or more natural language attribute data sets based on the fourth identification of the second word.

5. The system of claim 1, wherein the attribute data comprises a plurality of attribute values for the set of attributes associated with the first word.

6. The system of claim 1, wherein the correlation data comprises a deviation data element for each of the plurality of possible translations.

7. The system of claim 6, wherein the deviation data element comprises a deviation distance value and a deviation range value.

8. The system of claim 1, wherein the NLT circuitry is further configured to generate the translation based on a mean absolute deviation technique or a median absolute deviation technique.

9. The system of claim 1, wherein the NLT circuitry is further configured to:
   generate a mean absolute deviation value for each of the plurality of possible translations;
   select one of the plurality of possible translations having a mean absolute deviation value less than all others of the plurality of possible translations, and
   generate the translation based on the selection of the possible translation.

10. The system of claim 1, wherein the sequence of words provided by the user comprises a sequence of words spoken by the user.

11. A method for processing electronic information indicative of natural language, the method comprising:
   receiving, by natural language identification (NLI) circuitry, first electronic information indicative of a sequence of words provided by a user, wherein the sequence of words comprises a first word in a first natural language, and wherein the first word corresponds to a plurality of possible translations in a second natural language;
   identifying, by the NLI circuitry, the first word based on the first electronic information;
   identifying, by the NLI circuitry, the first natural language based on the first electronic information;
   receiving, by exogenous event identification (EEI) circuitry, second electronic information indicative of an exogenous event;
   identifying, by the EEI circuitry, the exogenous event based on the second electronic information;
   generating, by natural language attribute (NLA) circuitry in communication with the NLI circuitry and the NLA circuitry, one or more natural language attribute data sets based on the identified first word, the identified first language, and the identified exogenous event, wherein each of the one or more natural language attribute data sets comprises attribute data for a set of attributes associated with the first word;

generating, by natural language transliteration (NLT) circuitry in communication with the NLA circuitry, a natural language transliteration data set based on the one or more natural language attribute data sets, wherein the natural language transliteration data set comprises correlation data for each of the plurality of possible translations; and generating, by the NLT circuitry based on the natural language transliteration data set, a translation of the first word in the second natural language.

12. The method of claim 11, further comprising:
transmitting, by the NLT circuitry to text-to-speech (TTS) circuitry in communication with the NLT circuitry, the translation;
receiving, by the TTS circuitry, the translation; and
generating, by the TTS circuitry based on the translation, third electronic information indicative of a vocal representation of the translation.

13. The method of claim 11, further comprising:
identifying, by the NLI circuitry based on the first electronic information, a tone of the sequence of words provided by the user,
wherein the generating the one or more natural language attribute data sets comprises generating, by the NLA circuitry based on the identified tone, the one or more natural language attribute data sets.

14. The method of claim 11, wherein the sequence of words further comprises a second word in the first natural language, the method further comprising:
identifying, by the NLI circuitry based on the first electronic information, the second word,
wherein the generating the one or more natural language attribute data sets comprises generating, by the NLA circuitry based on the identified second word, the one or more natural language attribute data sets.

15. The method of claim 11, wherein the sequence of words provided by the user comprises a sequence of words spoken by the user, the method further comprising:
receiving, by speech-to-text (STT) circuitry in communication with the NLI circuitry, third electronic information indicative of the sequence of words spoken by the user;
generating, by the STT circuitry based on the third electronic information, the first electronic information, wherein the first electronic information is indicative of a textual representation of the sequence of words spoken by the user; and
transmitting, by the STT circuitry to the NLI circuitry, the first electronic information.

16. The method of claim 11, wherein the attribute data comprises a plurality of attribute values for the set of attributes associated with the first word.

17. The method of claim 11, wherein the correlation data comprises a deviation data element for each of the plurality of possible translations, and wherein the deviation data element comprises a deviation distance value and a deviation range value.

18. The method of claim 11, wherein the generating the translation comprises generating, by the NLT circuitry, the translation based on a mean absolute deviation technique or a median absolute deviation technique.

19. The method of claim 11, further comprising:
generating, by the NLT circuitry, a mean absolute deviation value for each of the plurality of possible translations; and
selecting, by the NLT circuitry, one of the plurality of possible translations having a mean absolute deviation value less than all others of the plurality of possible translations,
wherein the generating the translation comprises generating, by the NLT circuitry, the translation based on the selected possible translation.

20. A computer program product for processing electronic information indicative of natural language, the computer program product comprising at least one non-transitory computer-readable storage medium storing program instructions that, when executed, cause an apparatus to:
receive first electronic information indicative of a sequence of words provided by a user, wherein the sequence of words comprises a first word in a first natural language, and wherein the first word corresponds to a plurality of possible translations in a second natural language;
generate a first identification of the first word based on the first electronic information;
generate a second identification of the first natural language based on the first electronic information;
receive second electronic information indicative of an exogenous event;
generate a third identification representing the exogenous event based on the second electronic information;
generate, based on the first identification of the first word, the second identification of the first natural language, and the third identification representing the exogenous event, one or more natural language attribute data sets, wherein each of the one or more natural language attribute data sets comprises attribute data for a set of attributes associated with the first word;
generate, based on the one or more natural language attribute data sets, a natural language transliteration data set comprising correlation data for each of the plurality of possible translations; and
generate, based on the natural language transliteration data set, a translation of the first word in the second natural language.

* * * * *